(12) United States Patent
Chancey et al.

(10) Patent No.: US 11,360,190 B2
(45) Date of Patent: Jun. 14, 2022

(54) HARDWARE IN THE LOOP SIMULATION AND TEST SYSTEM THAT INCLUDES A PHASED ARRAY ANTENNA SIMULATION SYSTEM PROVIDING DYNAMIC RANGE AND ANGLE OF ARRIVAL SIGNALS SIMULATION FOR INPUT INTO A DEVICE UNDER TEST (DUT) THAT INCLUDES A PHASED ARRAY SIGNAL PROCESSING SYSTEM ALONG WITH RELATED METHODS

(71) Applicant: The United States of America, as represented by the Secretary of the Navy, Crane, IN (US)

(72) Inventors: Mark Alan Chancey, Solsberry, IN (US); John Andrew Supel, Crane, IN (US); John Matthew Miller, Bloomington, IN (US); Nicholas Norbert Lee Schuetz, Loogootee, IN (US); Jerry Carson Turjanica, Bloomington, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 464 days.

(21) Appl. No.: 16/506,411

(22) Filed: Jul. 9, 2019

(65) Prior Publication Data
US 2020/0333434 A1 Oct. 22, 2020

Related U.S. Application Data

(60) Provisional application No. 62/836,655, filed on Apr. 20, 2019.

(51) Int. Cl.
*G01S 7/40* (2006.01)
*H01Q 3/26* (2006.01)

(52) U.S. Cl.
CPC ........... *G01S 7/4004* (2013.01); *H01Q 3/267* (2013.01)

(58) Field of Classification Search
CPC .............................. G01S 7/4004; H01Q 3/267
See application file for complete search history.

(56) References Cited

U.S. PATENT DOCUMENTS

| 5,752,167 A * | 5/1998 | Kitayoshi | H01Q 3/08 324/617 |
| 2014/0303954 A1 * | 10/2014 | Slutzky | G06F 30/367 703/13 |
| 2017/0310004 A1 * | 10/2017 | Swirhun | H01Q 3/28 |
| 2021/0234614 A1 * | 7/2021 | Zhao | H04B 10/63 |

* cited by examiner

*Primary Examiner* — Vladimir Magloire
*Assistant Examiner* — Nazra Nur Waheed
(74) *Attorney, Agent, or Firm* — Naval Surface Warfare Center, Crane Division; Christopher A. Monsey

(57) ABSTRACT

A hardware in the loop simulation and test system that includes a phased array antenna simulation system providing dynamic range and angle of arrival signals simulation and synchronizing for input into a system under test (SUT) that includes a phased array signal processing system along with related methods. Embodiments include system elements that increase precision of signal simulation to include reduced error in angular resolution.

13 Claims, 19 Drawing Sheets

| Simulation entity and environment scenario simulation configuration files (Input Scenario DIS Data Elements, e.g., CraneDIS Data 66) | Description | Exemplary Protocol Data Unit (PDU) String Format | |
|---|---|---|---|
| PlatformData | PlatformData is a modified version of an IEEE 1278 Entity State PDU (ESPDU) that has has a subset of information including location and orientation of an entity within a given scenario which could be an emitter or any other object or entity which could affect a given simulation. Information includes call sign, platform ID, location (latitude/longitude), altitude, orientation (yaw, pitch, roll), and velocity vector (x, y, z), date/time stamp of PDU update. | PlatformData CallSign PlatformID "ddd yyyy hh:mm:ss" lat lon alt yaw pitch roll vx vy vz | 67 |
| EmissionData | EmissionData is a modified version of Electromagnetic Emission PDU (EEPDU) from the IEEE 1278 standard. The EEPDU has various emissions related information such as location, frequency, power, bandwidth, pulse width, pulse repetition frequency, azimuth center, azimuth sweep, elevation center, elevation sweep, beam sweep synch, and emitter ID, beam ID, emission ID, and call sign, date/time stamp of PDU update. | EmissionData CallSign EmissionID "ddd yyyy hh:mm:ss" lat lon hgt freq bw erp prf pw az_center az_sweep el_center el_sweep beam_sweep_syn EmitterID BeamID | 69 |

Fig. 6

| Data Structures | Description | Element # |
| --- | --- | --- |
| DelayString | A data string, called DelayString, storing control data generated by setup/configuration phase function calls. This string includes delay related information and other data stored in CraneDIS format for use in generating control messages during message phase operations. An exemplary data structure can be comma delineated as follows:<br><br>Quad, Time, MB_SBI_Array 1 Delay, MB_SBI_Array 2 Delay, MB_SBI_Array 3 Delay, MB_SBI_Array 4 Delay, MB_LBI_Array 1 Delay, MB_LBI_Delay 2, LB_SBI_Array 1 Delay, LB_SBI_Array 2 Delay, LB_LBI_Array 1 Delay, LB_LBI_Array 2 Delay, Angle, Power, Frequency | 71A |
| timeDelays variable | Class data variable created by function calls, e.g., SetTimeDelayData, that accesses / reads DelayString 71A data to perform a given function call operation | 71B |

Fig. 7A

| DelayString Data 71A (and 71B) | Description | Element |
|---|---|---|
| Quadrant | Gives what antenna quadrant has been selected for simulation where more than one set of phased arrays having different or overlapping fields of view or scan fields/apertures are used or simulated. For example, an aircraft can have four sets of phased array antennas denoted by quadrants A, B, C, and D (e.g., on either side of the aircraft nose and either of the aircraft tail) which are oriented towards a desired system field of view or orientation, e.g., 90 degree fields of view or orientations. | 71A1 |
| Time | Gives a time that commands should be sent in the format Month/Day/Year hh:mm:ss | 71A2 |
| MB_SBI_Array 1 Delay | Gives the delay in pico seconds for a first midband (MB) short baseline interferometry (SBI) array | 71A3 |
| MB_SBI_Array 2 Delay | Gives a delay in pico seconds for a second MB SBI array | 71A4 |
| MB_SBI_Array 3 Delay | Gives a delay in pico seconds for a third MB SBI array. In one embodiment, this value is set to 0 when it is used as a reference. | 71A5 |
| MB_SBI_Array 4 Delay | Gives a delay in pico seconds for a fourth MB SBI array | 71A6 |
| MB_LBI_Array 1 Delay | Gives a delay in pico seconds for a first MB long baseline interferometry (LBI) array | 71A7 |
| LB_SBI_Array 1 Delay | Gives a delay in pico seconds for a first lowband (LB) SBI array | 71A8 |
| LB_SBI_Array 2 Delay | Gives a delay in pico seconds for a second LB SBI array | 71A9 |
| LB_LBI_Array 1 Delay | Gives a delay in pico seconds for a first LB LBI array | 71A10 |
| LB_LBI_Array 2 Delay | Gives a delay in pico seconds for a second LB LBI array | 71A11 |
| Angle | Angle of arriva | 71A12 |
| Power | Signal power | 71A13 |
| Frequency | Signal frequency | 71A14 |

Fig. 7B

| Dynamic Direction of Arrival (DOA) simulation software (DOASS) Function Calls 51 | Description | Element numbers |
|---|---|---|
| BtnOpenFile_Click(System::Object^ sender, System::EventArgs ^e) | An Auto 53 phase function executed when Auto Setup GUI window 53A is operated which executes related function calls. Once a user selects an auto radio button is selected, then the Select File Open window is enabled so to prompts a user to select/load a file that includes predetermined CraneDIS (modified DIS) input Scenario DIS Platform Data (see Fig. 6) that the user wishes the DOASS program to execute. Once the file is loaded, each line of data in the selected file get parsed and separated into one of two arrays based on data type, either Platform or Emitter data (e.g., first word in a line is either "platform" or "emitter"). Now the lines get parsed and instantiated/saved into variables from or within platformData and emitterData classes. | 79 |
| SetTimeDelayData(platformData, emitterData, filenameSafe) | A setup phase function call included in BtnOpenFile_Click function call that receives data variable DelayString 71 which is later output as an instantiated local timeDelays variable. Takes the platform and emitter data (latitude, longitude, altitude, speed, heading, yaw, pitch, roll) and calculates all of the values that are needed to control the DOASS system (Quadrant, Time, MBSBI array 1,2,3,4, LBSBI array 1,2, LBLBI array 1,2, angle, power, frequency). These values are stored into a variable DelayString 71A and outputted into a .txt file to be accessed after setup is complete (a messaging phase executed after setup is complete). | 79A |
| SetupInstraments (timeDelays) | Function call included in BtnOpenFile_Click 79 that reads DelayString 71 data created by SetTimeDelayData 4A, saves as a local instantiation of timeDelays 71B and sets the exemplary DOA system to an initial configurations based on a scenario loaded (e.g., Input Scenario DIS Platform Data Elements (CraneDIS Data) 66). System elements that are configured by this function include RF switch, Optical delay lines, analog signal generators (ASGs) 3, attenuators 9, trombone delay lines (not shown in any figures but associated with a separate antenna used with an exemplary EM system under test 7A e.g. a antenna system that operates in parallel for geolocation calculation of a system under test which does not use angle of arrival information but rather receives information directly from the EM Environment Signal Generator System 3 (does not go through the SDSAS 5)). | 79B |
| btnRun(System::Object ^ sender, System::EventArgs ^e) | A function with sub-functions that executes GUI button function 53B that enables a user to read the data string file DelayString 71A created from the Setup/Reconfiguration Phase and storing DelayString 71A information into another local instantiated class of timeDelays 71B. Then waits a set amount of time to call SendData. | 85 |

Fig. 8A

| Dynamic Direction of Arrival (DOA) simulation software (DOASS) Function Calls 51 | Description | Element Number |
|---|---|---|
| GetData(timeDelays) | Called within btnRun 85. Reads the text file DelayString 71A from Setup and instantiates timeDelays 71B class with information from DelayString 71A. | 85A |
| SendData(TimeDelays) | Called within btnRun 85. Takes timeDelays 71B information and sends it to the appropriate DOA system element (e.g., RF switch 3, optical delay lines 29, ASGs 3, attenuators 9, trombone delay lines (see above for description). Exemplary calculations for various delay values are done in the setup or configuration phase while this function sends resulting TimeDelays 71B data to DOA system elements to configure or operate them. | 85B |
| SetStationaryMidBand (frequency, power, angle) | When Mid Band tab of GUI Manual mode 61 is selected/operated, takes the input frequency, power and angle inputs from this GUI 61 and sends commands to set up the DOA. Takes input angle and calculates an (X,Y) at a large distance away and then calculates the distance between that (X,Y) and each antenna array. Connects the sockets to the appropriate IPs and ports. Sends the delay, frequency, and power commands to various DOA elements e.g., RF switch 3, optical delay lines 29, ASGs 3, etc. | 86A |
| SetStationaryLowBand (frequency, power, angle) | When Low Band tab of GUI Manual mode 61 is selected/operated, takes the input frequency, power and angle inputs from this GUI 61 and sends commands to set up the DOA. Takes input angle and calculates an (X,Y) at a large distance away and then calculates the distance between that (X,Y) and each antenna array. Connects the sockets to the appropriate IPs and ports. Sends the delay, frequency, and power commands various DOA elements e.g., RF switch 3, optical delay lines 29, ASGs 3, etc. | 86B |
| GetDistance(X1, Y1, Z1, X2, Y2, Z2) | Returns the distance between two points (X1,Y1,Z1) (X2,Y2,Z2) in meters. | 86C |
| SendAbsIp(distance, Socket) | Sends the delay to one or more optical delay lines across a software socket. | 86D |
| SendFreqIpAsg(frequency, IpEndPoint) | Sends frequency to the ASG across IpEndPoint | 86E |
| SendPowerIpAsg(power, IpEndPoint) | Sends power to the ASG across IpEndPoint | 86F |

Selectively compensating for signal delay or lack of simultaneous output of the first plurality of amplified RF signals from the RF power splitter to within a predetermined time range, e.g., a picosecond, caused by the RF power splitter by passing the providing a plurality of phase and time stable rigid RF cables that are relatively temperature insensitive, where one end of the plurality of RF cables are respectively connected each of the plurality of RF power splitter output ports and each defining a part of each of the plurality of channel signal paths, where a length of each RF cable is further determined based on a signal transit delay difference determination between each of the plurality of fiber optic lines such that one or more of the plurality of RF cables are lengthened or shortened to within a range of delay capability associated with optical delay lines used in the SDSAS 5 to reduce differences between outputs from the SDSAS 5 to within a predetermined range, e.g., one picosecond, to further reduce signal timing output timing between each path at the SDSAS 5 output section.

213 transforming the split or multiplexed first plurality of amplified RF signals into a first plurality of optical signals associated with each of the signal paths using a laser modulators, laser or lasers, and optical splitter section that are driven by the split or multiplexed first plurality of amplified RF signals to generate a plurality of first optical signal outputs with phase, frequency, and power determined based on the input split or multiplexed first plurality of amplified RF signals.

215 providing a plurality of optical modulators 19 each comprising an optical signal input respectively coupled with one of the optical splitter outputs, a modulated optical signal output, an optical modulator RF input each coupled to one of the plurality of RF cables, and a DC voltage bias controller, wherein each of the optical modulators output a respective encoded optical waveform output encoded based on each of the amplified RF signals.

217 receiving the respective encoded optical waveform outputs from the plurality of optical modulators and generating a plurality of first and second percentage of input optical signal power outputs respectively using a plurality of optical splitters 21, each comprising an optical splitter input port and a plurality of optical splitter output ports, wherein the plurality of optical splitter output ports comprises a first optical splitter output port and a second optical splitter output port, wherein the first optical splitter output port outputs the first percentage of input optical signal power output and the second optical splitter output port outputs the second percentage of input optical signal power output, wherein said second optical splitter output port is connected to a DC voltage bias controller to provide a feedback loop to each of the optical modulators based on the second percentage of input optical signal power output.

Fig. 11B

219 receiving and routing the percentage of input optical signal power outputs to a plurality of variable optical time delay modules using a plurality of optical circulators each comprising a first, second and third optical circulator signal ports wherein each said first optical circulator signal port is respectively coupled with one said first optical splitter output port that further defines a portion of a respective one of said plurality of channel signal paths, wherein each of the optical circulator signal ports are bidirectional optical signal ports, wherein the plurality of variable optical delay modules is respectively associated with one of said channels, wherein each of said variable optical delay module is coupled with a respective second optical circulator signal ports, wherein each of said plurality of variable optical delay modules comprises an optical delay line section and a variable optical delay line control section that controls the delay line section, each said variable optical delay module provides a selectively adjustable time delay, wherein the variable optical delay line control section is coupled to said control computer and is operated by said simulation control software that adjusts time delay of each optical signal received from a respective said first optical circulator signal port that then passes through a respective optical delay line section to provide RF phase difference adjustment equivalents via respective time delay adjustments in an optical domain to the optical signal received from the respective first optical circulator signal port that is adjusted to correlate to a specified angle of arrival associated with each of the antenna nodes within the simulated phased array antenna, wherein variable optical delay module outputs are routed back to respective said second optical circulator signal port then out of each respective optical circulator via respective ones of said third optical circulator signal ports to a respective one of a plurality of photodetectors 23, wherein the plurality of photodetectors 23 converts input optical signals to a voltage output signal;

221

Respectively receiving voltage signal outputs from the plurality of photodetectors using a plurality of direct current (DC) blocks 24 that are each respectively coupled with respective ones of said plurality of photodetectors, wherein each DC block outputs a voltage signal corresponding to an optimized delayed signal output corresponding to respective said variable optical delay module outputs, wherein each of said DC comprises a DC block output connector that outputs the plurality of simulated RF antenna signals from the SDSAS 5;

223 amplifying outputs from the plurality of DC blocks using a plurality of amplifiers each coupled to receive SDSAS 5 outputs comprising amplified said plurality of simulated RF antenna signals from respective DC block output connectors; and

225 processing amplified said plurality of simulated RF antenna signals from the plurality to of amplifiers using the system under test that receives the plurality of amplified simulated RF antenna signals outputs from the respective plurality of amplifiers then performs signal processing comprising phase and amplitude measurements.

Fig. 11C

Software processing steps when a location is updated (either emitter or platform). In one example, updates can include a case where a plane moves five
times before a new emitter location is given, or vise versa.

Because of this we want to check each time which object created the new delays.

Example:

We are given the below data.

PlatformData Alpha15 45 "001 2013 00:08:00"
        PlatformData Alpha15 45 "001 2013 00:08:40"

EmissionData Alpha15 45 "001 2013 00:08:30"
        EmissionData Alpha15 45 "001 2013 00:08:35"
        EmissionData Alpha15 45 "001 2013 00:08:40"
        EmissionData Alpha15 45 "001 2013 00:08:45"
        EmissionData Alpha15 45 "001 2013 00:08:50"

The first delay times passed will be paired with 00:08:30 because that's when we get the first\complete set of data.

Then we want to see what will move next, so we look at count + 1 and compare times. So we would be looking at 00:08:40 and 00:08:35. This means that at 00:08:35 the Platform is still at the 00:08:00 location, so we have to compare the 00:08:00 PlatformData with the 00:08:35 EmissionData. So we have to only step the emitterCount and no the platformCount.

DelayString: Quad, Time, MB_SBI_Array 1 Delay,
MB_SBI_Array 2 Delay, MB_SBI_Array 3 Delay,
MB_SBI_Array 4 Delay, MB_LBI_Array 1 Delay,
MB_LBI_Delay 2, LB_SBI_Array 1 Delay, LB_SBI_Array 2
Delay, LB_LBI_Array 1 Delay, LB_LBI_Array 2 Delay, Angle,
Power, Frequency

Fig. 13B

HARDWARE IN THE LOOP SIMULATION AND TEST SYSTEM THAT INCLUDES A PHASED ARRAY ANTENNA SIMULATION SYSTEM PROVIDING DYNAMIC RANGE AND ANGLE OF ARRIVAL SIGNALS SIMULATION FOR INPUT INTO A DEVICE UNDER TEST (DUT) THAT INCLUDES A PHASED ARRAY SIGNAL PROCESSING SYSTEM ALONG WITH RELATED METHODS

CROSS-REFERENCE TO RELATED APPLICATION

This application claims priority to U.S. Provisional Application Ser. No. 62/836,655 filed on Apr. 20, 2019, the disclosure of which is expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,541 and 200,593) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE INVENTION

The present invention relates to systems and methods for electromagnetic signal simulation systems that provides high fidelity models or simulates signals output from one or more a collections of antenna segments of a hypothetical phased array antenna receiving simulated signals including radio frequency (RF) signals. In particular, one or more embodiments include an electromagnetic environment simulation system including a signals source delivery system that addresses delay resolution problems associated with limitations with available components including phase fluctuations in part by converting from RF to optical, applying signal delays to N number of optical channels based on signal delay simulation scenario data (e.g. determined by computing signal propagations within a 3D model with emitter and receiver location, power, frequency, etc. data).

BACKGROUND AND SUMMARY OF THE INVENTION

An improved system was needed due to limitation arising from existing simulation and delivery systems. For example, one need included a system that could provide a direction of arrival capability to interlink into Live Virtual and Constructive (LVC) hardware-in-the loop scenarios to reduce simulation efforts without scheduling time of real world equipment such as ships, aircraft, mobile systems, etc. that have availability constraints as well as difficulties in bringing a lab capability to a field environment. In particular, a need existed to provide a solution that was capable of stimulating an exemplary system's requirements and being automated. Another desired outcome of a one exemplary design was to also reduce lab space. Another object was to improve a level of port to port time fidelity required to simulate or recreate real world signal sources. In some embodiments, use of an optical portion was introduced to gain space constraints and time fidelity.

Existing environment simulation or electromagnetic environment are made up of many signal generators interlinked together which are very high in cost as well as having other limitation with clock speed timing. Other simulators or generators that the government has developed for a simulation purposes utilize RF to Digital back to RF concepts to allow easy of simulating or stimulating of complex signals on the fly, however they are forced to use the timing of their processor (e.g., around 2 ns). Some other concepts also are the utilization of staying all in the RF with multiple delay lines, however this actually does have the delay line resolution required for the advanced source simulation or stimulation.

One advantage of at least one exemplary embodiment includes femtosecond (fs) resolution that currently cannot be measured to that level in RF due to the capability of test equipment. Various embodiment solution combined with another simulation system will provide the fidelity needed by various LVC community users. At least some embodiments provide improved fidelity of port to port timing due to use of an optical delay line's performance.

One advantage provided from embodiments of the invention that include application of timing port to port is not something that is currently available. Various advantages provided by various embodiments allows test and evaluation community to stimulate advanced threats that require needed fidelity of resolution for a given requirement or system to be effective.

Embodiments of the invention provide a capability that more closely approximates RF signal incidence on at least one receiver or set of receivers or groups of antennas in a free space environment. Embodiments can include an Electromagnetic (EM) Environment Simulation and Testing System (EMESTS) 1 that include a signals source hardware in the loop signal simulation delivery system. Exemplary hardware in the loop elements include a computer system/user interface (CSUI), dynamic direction of arrival (DDOA) system, and DDOA simulation software (DDOASS) software/along with related methods.

Generally, at least some embodiments can include a system that converts one category of electromagnetic signal (EM) signals into a different category of EM signals then applies signal delays to the second category of EM signals. Embodiments can include systems that determine signal delays that are applied to the second category of EM signals based on creating a three dimensional model that plots location of an emitter and a collection of antenna elements then computes signal propagation data at a given distance, frequency, power etc. computing different time/location of incidence of an EM wave on a system. Various embodiments convert number of radio frequency (RF) signals to optical signals, apply various delays to various optical channels based on a predetermined or input set of signal delay scenarios, conversion of optical signals with selectively applied signal delays back to RF signals, attenuating/amplifying the signals based on the delay scenarios, then inputting the amplified/attenuated selectively delayed RF signals into selected signal processing system under test (SUT) input ports then operating the signal processing system in various testing scenarios.

At least some embodiments of the invention are particularly useful for simulating higher frequency signals (e.g., above 10 GHz) which are useful for multiple platform receiver ambiguity reduction scenarios with hardware in the loop simulation which improve fidelity of simulation prior to moving to an open air test that provides high precision particularly with respect to high frequency signal timing needed to provide for different angles of arrival and an ability to evaluate design limitations associated with hardware within a hardware in the loop testing system(s).

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 6 shows an example of exemplary Simulation entity and environment scenario simulation configuration files (e.g., CraneDIS Data) used by an exemplary DDOASS that operates various elements of an exemplary EMESTS;

FIG. 7A shows exemplary data structures that store data generated by exemplary setup or configuration phase DDOASS function calls that are later used to generate message phase data that operates various exemplary EMESTS elements during exemplary message phase operations;

FIG. 7B shows an exemplary table with a more detailed description of DelayString data in accordance with one embodiment of the invention;

FIG. 8A shows a description of exemplary DDOASS function calls in accordance with one exemplary embodiment of the invention;

FIG. 8B shows a continuation of descriptions of exemplary DDOASS function calls in accordance with one embodiment of the invention;

FIG. 11B shows a continuation of the FIG. 11A exemplary method;

FIG. 11C shows a continuation of the FIGS. 11A and 11B exemplary methods;

FIGS. 13A and 13B shows an exemplary high level flow chart showing execution of an auto or automatic phase sequence of operations of exemplary DDOASS software and EMESTS system in accordance with one embodiment of the invention.

DETAILED DESCRIPTION

The embodiments of the invention described herein are not intended to be exhaustive or to limit the invention to precise forms disclosed. Rather, the embodiments selected for description have been chosen to enable one skilled in the art to practice the invention.

Figure 1:
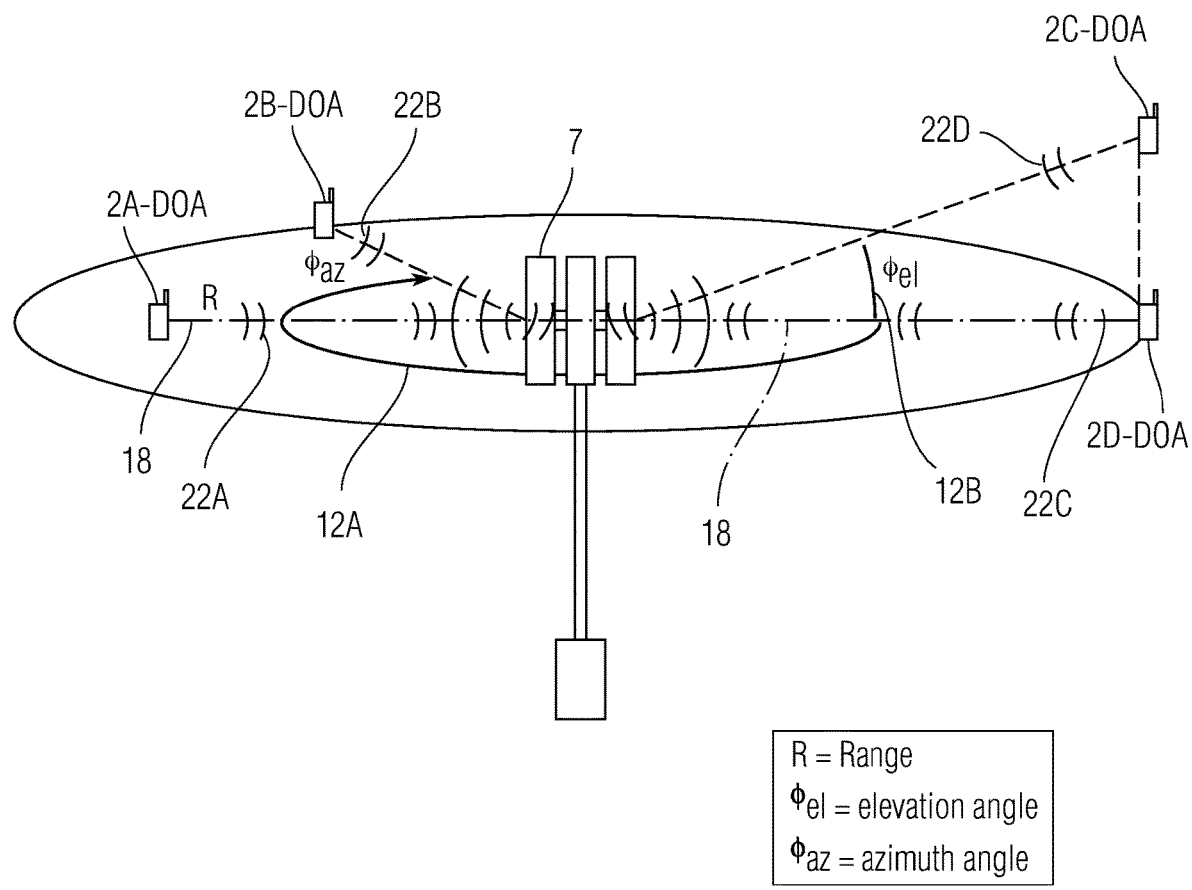
FIG. 1 shows a simplified representation of a simulated environment that an exemplary EMESTS 1 is used to simulate showing positions of an emitter at different locations with respect to selected phased array antenna elements in accordance with one embodiment of the invention.

FIG. 1 shows a simplified representation of a simulated environment that an exemplary hardware in the loop Electromagnetic (EM) Environment Simulation and Testing System (EMSTS) simulated. In particular, FIG. 1 shows a single simulated emitter/entity or platform scenarios 2A, 2B, 2C, 2D which shows different simulation scenarios of the single emitter/entity sending different simulated signals 22A, 22B, 22C, 22D from different locations/times (or angle in a physical domain) relative to the phased array antenna elements 7. The shown simulated phased array antennas 7 in FIG. 1 are coupled with a SUT (e.g., EM System Under Test 7A). The antennas 7 shown in FIG. 1 includes a set of phased array elements. The EMSTS system simulates direction of arrival of one or more signals incident to N number of antenna array elements. For example, in FIG. 1 three (3) phased array antennas 7 are shown. The simulated signals 22A, 22B, 22C, 22D simulates the same emitter at different locations, times (or angle(s)), and distances 18, different elevation angles 12B, and different azimuth angles 12A relative to elements of the phased array antenna system 7.

Time Delay Accuracy Overview. Exemplary Dynamic Range and Angle of Arrival Signals Simulation (DRAASS) or SDSAS systems can operate in multiple, e.g., two, different operational band; LOW and MID band. LOW and MID band times delay accuracies are treated separately. An exemplary requirement can be for a SUT requirements that can be, e.g., LOW Band: ±11.1 pS; MID Band: ±1.23 pS. An exemplary DRAASS or SDSAS outputs are required to meet a test accuracy ratio (TAR) of 4:1 based on exemplary DRAASS or SDSAS system needs to characterize a SUT system performance.

Design Specification, Time Delay Accuracy Example. Exemplary DRAASS or SDSAS time delay accuracy design requirement can be: LOW Band: ±2.775 pS; MID Band: ±0.3075 pS. In this example, within both Bands, LOW and MID, the exemplary SUT (e.g., cell tower system) performs many measurements, two of which are direction of arrival and geolocation. Exemplary direction of arrival can be achieved with a short base-line interferometry (SBI) array, while geolocation can be achieved with a long base-line interferometry (LBI) array. In this example, both LOW and MID bands may have SBI and LBI arrays that are independently used to make measurements. Exemplary DRAASS or SDSAS system design may handle SBI and LBI differently, even though they are very similar. In this example, difference between SBI and LBI can include an amount of required total time delay simulated to correspond to simulated signal arrival at each simulated array element. Time delay in the SBI array exemplar can be handled with a motorized optical variable delay line while the LBI array will be handled partially with a RF programmable delay line.

Generally, in view of FIGS. 1-4, various embodiments of the invention can include hardware in the loop simulation and test system that includes a phased array antenna simulation system providing dynamic range and angle of arrival signal simulation associated with a plurality of simulated phased array antenna nodes. A phased array antenna simulation system control computer (CSUI) 4 (see FIG. 2) that can include a processor, input/output section, a display, and a data or machine instruction storing various simulation control software machine instructions adapted to control said hardware in the loop simulation and test system. A communication server can be coupled with the CSUI 4 (not shown). The exemplary communication server can include a number of communication bus lines (e.g., a first, second, third, fourth, fifth, and sixth plurality of communication bus lines (not specifically shown but these bus lines connect various components with the communication server which in turn connects the CSUI 4). A radio frequency (RF) environment signal generator system (e.g., EM Environment Simulation and Testing System 1) that generates a number of RF signals outputs each corresponding to a simulated RF signal. Various exemplary SDSAS 5 systems can be provided that includes a number of phased array antenna simulation signal simulation processing system elements that includes optical components forming or providing a number of optical signal paths for generating a number of simulated RF antenna signal outputs. Exemplary SDSAS 5 systems can include an interface section having an input 35 and output section 24. The input section 35 includes an RF input section that is respectively coupled to one RF output of the RF signal generator (e.g., EM Environment Signal Generator System and Switch Box/Splitter 3) thereby receiving RF signal outputs. The output section 24 includes a number of phased array antenna simulation signal system RF outputs (DC Blocks 24). The input section 35 further includes a power input and conditioning system input and a number of control signal bus elements coupled with the first plurality of communication signal bus lines (e.g., CAT 5 Ethernet cables connected to the communication server). A radio frequency (RF) low noise amplifier (LNA) 16 can be provided and coupled with the input section's 35 RF input that receives RF inputs from the RF signal generator 3. The RF input signals are increased inside the LNA 16 and output as an amplified RF signal. An RF power splitter 15 is also provided that includes an RF power splitter input port and a number of RF power splitter output ports. In one or more embodiments, the RF power splitter 15 also can be referred to as a 4-way power divider. In this embodiment, each of the RF power splitter's 15 output ports are associated with or defining a respective one of a number of channel signal paths each associated with one of the simulated phased array antenna nodes. The RF power splitter 15 receives the amplified RF signal from the LNA 16 at its RF input port and splits the amplified RF signal evenly to the RF power splitter's 15 RF output ports. A number of rigid RF cables 17 are provided where one end of the RF cables 17 are respectively connected each of the RF power splitter 15 output ports and each defining a one of each of the channel signal paths. A length of each rigid RF cable 17 can be determined based on a signal transit delay difference determination between each of the fiber optic lines connecting various components within the SDSAS 5 along a collective signal path defined from input section 35 to output section 24 such that one or more of the rigid RF cables 17 may be lengthened or shortened to ensure that outputs from the SDSAS 5 at output section 24 are output simultaneously within a predetermined range to accommodate for signal timing of arrival discrepancies between each path arriving at the SDSAS output section 24. A laser system 27 is also provided which is used to provide optical signal inputs within the SDSAS 5. An optical splitter 31 is also provided which is coupled with the laser system 27. The optical splitter 31 further includes a number of optical splitter outputs. A number of optical modulators 19 are provided that each include an optical signal input respectively coupled with one of the optical splitter 31 outputs, a modulated optical signal output, an optical modulator RF input each coupled to one of the plurality of rigid RF cables 17, and a direct current (DC) voltage bias controller 21 maintains a constant modulator bias point by continuously adjusting the DC voltage bias controller 21 to a predetermined set point. Each of the exemplary optical modulators 19 encode a respective waveform of each of the amplified RF signals that is output by each of its modulated optical signal outputs. A number of optical splitters 22 (e.g., 99% to 1% splitter) are provided that each include an optical splitter input port and a number of optical splitter output ports. The optical splitter's 22 optical splitter output ports include a first optical splitter output port and a second optical splitter output port; the first optical splitter output port outputs a first percentage of input optical signal strength power output and the second optical splitter output port outputs a second percentage of input optical signal strength power output (e.g., first output port outputs 99% of input power and second port outputs % (e.g., 1%) of input port power); the exemplary second optical splitter output port is connected to the DC voltage bias controller 21 to provide a feedback loop to each of the optical modulators 19. A number of optical circulators 25 are provided each including a first, second and third optical circulator signal ports; each of the first optical circulator signal ports are respectively coupled with one of the first optical splitter output ports that further defines a portion of a respective one of the collective channel signal paths. Each of the optical exemplary circulator 25-signal ports are bidirectional optical signal ports. A number of photodetectors 23 are provided that convert input optical signals to a voltage output signal. A number of variable optical delay (VODL) modules 29 are also provided. In this embodiment, each of the VODL modules 29 are respectively associated with a portion of one of the channels. Each of the exemplary VODL modules 29 are coupled with a respective of the second optical circulator signal ports. Each of the VODL modules 29 are formed with an optical delay line section and a variable optical delay line control section that controls the delay line section. Each exemplary one of the VODL modules 29 provides a selectively adjustable time delay wherein the variable optical delay line control section is coupled to the CSUI 4 and is operated by the simulation control software that adjusts time delay of each optical signal received from a respective first optical circulator signal port that then passes through a respective optical delay line section to provide RF phase difference adjustment equivalents via respective time delay adjustments in an optical domain to the optical signal received from the respective first optical circulator signal port that is adjusted to correlate to a specified angle of arrival associated with each of the antenna nodes within the simulated phased array antenna. The exemplary VODL module 29 outputs are routed back to respective ones of the second optical circulator signal ports then out of each respective optical circulator via respective ones of the third optical circulator signal ports to a respective one of the photodetectors 23. A number of DC blocks 24 are each respectively coupled with respective ones of the photodetectors 23 where each DC block outputs a voltage signal corresponding to an optimized delayed signal output corresponding to respective VODL module outputs 29. Each exemplary DC block 24 includes a DC block output connector that outputs simulated RF antenna signals from the SDSAS 5.

Figure 2:
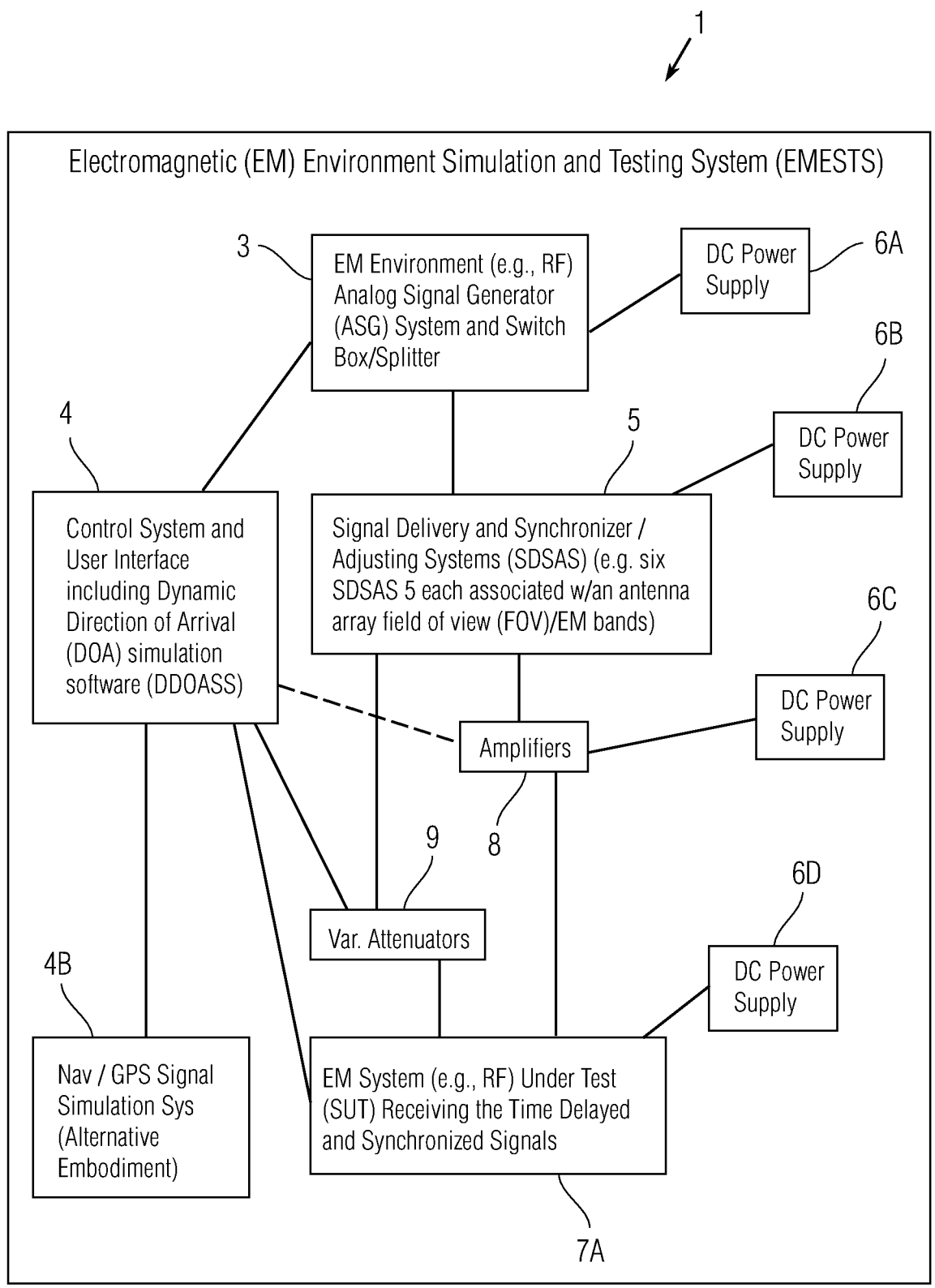
FIG. 2 shows a simplified system architecture for at least one embodiment of an exemplary EMESTS.

As shown in FIG. 2, a number of amplifiers 8 are coupled to receive SDSAS 5 outputs from the DC blocks 24 in a form of the plurality of simulated RF antenna signals from respective DC block output connectors. As further shown in FIG. 1, an RF SUT 7A receives the simulated RF antenna signals outputs from the respective amplifiers 8 then performs signal processing comprising phase and amplitude measurements. Note FIG. 1 shows two different signal output paths (one through the amplifier 8 and one through the variable attenuators 9. In at least some embodiments, multiple SDSAS 5 (e.g., two) receive low band inputs from the ASG(s) 3 that generates low band outputs and other SDSAS 5 systems that receive higher band inputs from the ASG(s) 3 that generates higher band outputs. Note a single ASG 3 can be used that outputs multiple band outputs to the different SDSAS 5 systems versus use of multiple different ASGs 3.

In particular, FIG. 2 shows a simplified system architecture for at least one embodiment of an EMESTS 1. A Control System and User Interface (CSUI) 4 is provided to control various aspects or equipment items. The CSUI 4 includes various control software including exemplary DDOASS 4A. One or more EM Environment Signal Generator Systems (e.g., an analog signal generator (ASG)) 3 can be provided that generates a variety of desired EM signals (e.g., RF signals) associated with one or more signal sources within an expected or simulated EM environment based on at least inputs from the CSUI 4. One or more SDSAS 5 systems are also provided which receives outputs from the ASG 3 and control signals from the CSUI 4. Amplifiers 8 and Variable Signal Attenuators (VSA) 9 are provided. Some SDSAS 5 systems provide outputs to Amplifiers 8 and some are coupled to VSAs 9. VSAs 9 are provided to enable amplitude balance to provide outputs which are closer open air-like or real world signal propagation (e.g., system under test power balance needs). An EM SUT 7A receives outputs from the VSA 9 and Amplifiers 8. The EMSUT 7, VSA 9 and Amplifiers 8 are also coupled with and interact with the CSUI 4. A number of power supplies (e.g., DC Power Supply) 6A-6D are coupled separately with the one or more ASG 3, the one or more SDSAS 5, Amplifiers 8, VSAs 9, and SUT 7A. In an alternative embodiment where movement of a SUT 7A is being simulated, then a navigation or global positioning system (GPS) signal simulation system 4B is added which is controlled by the CSUI 4 and DDOASS 4A. The simulation system 4B feeds desired or simulated coordinates for locations of the SUT 7A within a simulated environment.

Figure 3:
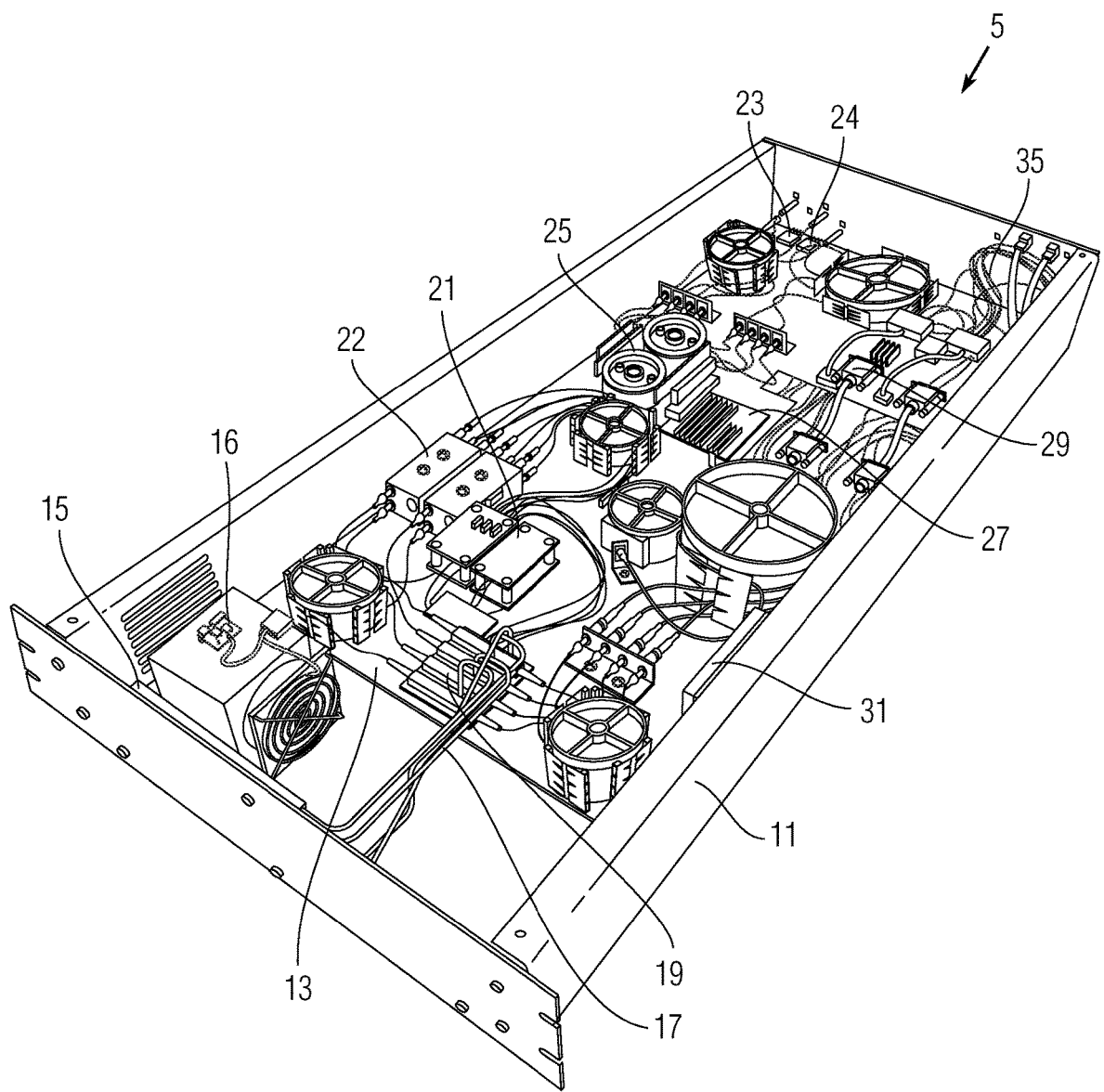
FIG. 3 shows a perspective view of an exemplary Signal Delivery and Synchronizer/Adjusting System (SDSAS) that is a part of the EM Environment Simulation and Testing System in accordance with one embodiment of the invention.

FIG. 3 shows a perspective detail view of an exemplary one or more SDSAS assembly 5 that is a part of the exemplary EMESTS 1. Generally, a chassis or box 11 is provided to house various components of the SDSAS assembly 5. The SDSAS assembly 5 includes a variety of components including optical components that are useful in enabling various aspects of one or more embodiments of the invention. In this example, various components, including optical elements, are installed on a separate and removable support or platform 13 within the chassis or box 11 to improve maintainability or access to various parts. This SDSAS 5 includes an RF interface section 35 that includes an input and output section that further includes an RF input section that is respectively coupled to one RF output of said RF Signal Generator 3 and signal conditioning system thereby receiving one of said plurality of RF signal outputs, a plurality of phased array antenna simulation signal system RF outputs, a power input and conditioning system input, and a plurality of control signal bus elements coupled with said first plurality of communication signal bus lines;

Input signals from a respective ASG 3 are delivered into the SDSAS assembly 5 through a back panel of the enclosure 11 and routed into a radio frequency (RF) low noise amplifier (LNA) 16. The original input signal amplitude is increased inside the LNA 16 and then routed to an RF power divider 15, that accepts a signal at a single RF input port and splits the power to all the RF output ports. The split signals then travel through rigid RF cables 17 to the optical modulators 19 wherein the each of the rigid RF cables 17 has an electrical line length that adjusts a phase of each RF signal passing through a respective RF cable 17 so that each RF output signal arrives at an RF output of enclosure 11 (an output of DC Blocks 24) simultaneously (within a predetermined tolerance range, e.g., a maximum phase difference of RF signal associated with each channel of plus or minus half a degree, plus or minus three degrees, etc.). In this embodiment, use of the rigid RF cables 17 with selected lengths is necessary to accommodate for length discrepancies between each signal path. The optical modulators 19 encode a given RF signal onto an optical carrier provided by a power divided 31 light source 27. The encoded signal is optimized by a feedback loop consisting of optical couplers 23 and DC voltage bias controllers 21. A small portion of the encoded optical carrier if feed into the DC voltage bias controller 21 which feeds a control signal into the optical modulators 19. The encoded optical carriers are sent to the optical circulators 25 then to the VODL 29. An exemplary optical circulator 25 can be a three- or four-port optical device designed such that light entering any port exits from the next port of the optical circulator 25. In other words, if light enters optical circulator 25 port A (not shown), the light then is emitted from port B (also not shown) to the respective VODLs 29 which then sends VODL 29 outputs back to port B (not shown) then out of port C (not shown) of the optical circulator 25. (note, in specification sheets, these ports are referenced numerically e.g., port "1", "2", "3", etc.) In this example, the optical circulators 25 are used for signal routing and signal path isolation similar to a static switch that allow routing from an input to an output without addition input. Optical circulators can include embodiments that include non-reciprocal optics (e.g., changes in properties of light passing through the optical circulator 25 are not reversed when the light passes through in the opposite direction). Avoidance of reversal of light can occur, for example, if a symmetry of an exemplary system is broken, for example, by an external magnetic field. A Faraday rotator is another example of a non-reciprocal optical device, and indeed it is possible to construct an optical circulator based on a Faraday rotator. An exemplary VODL 29 adds a specific time delay to an input signal that is derived and controlled by the SDSAS 5 and CSUI 4. The delayed optical signals are sent back to the optical circulators 25 and routed to proper photodetector 23. Each photodetector 23 has a DC block 24 at its respective output that delivers the optimized delayed signal out of the enclosure 11.

Figure 4:
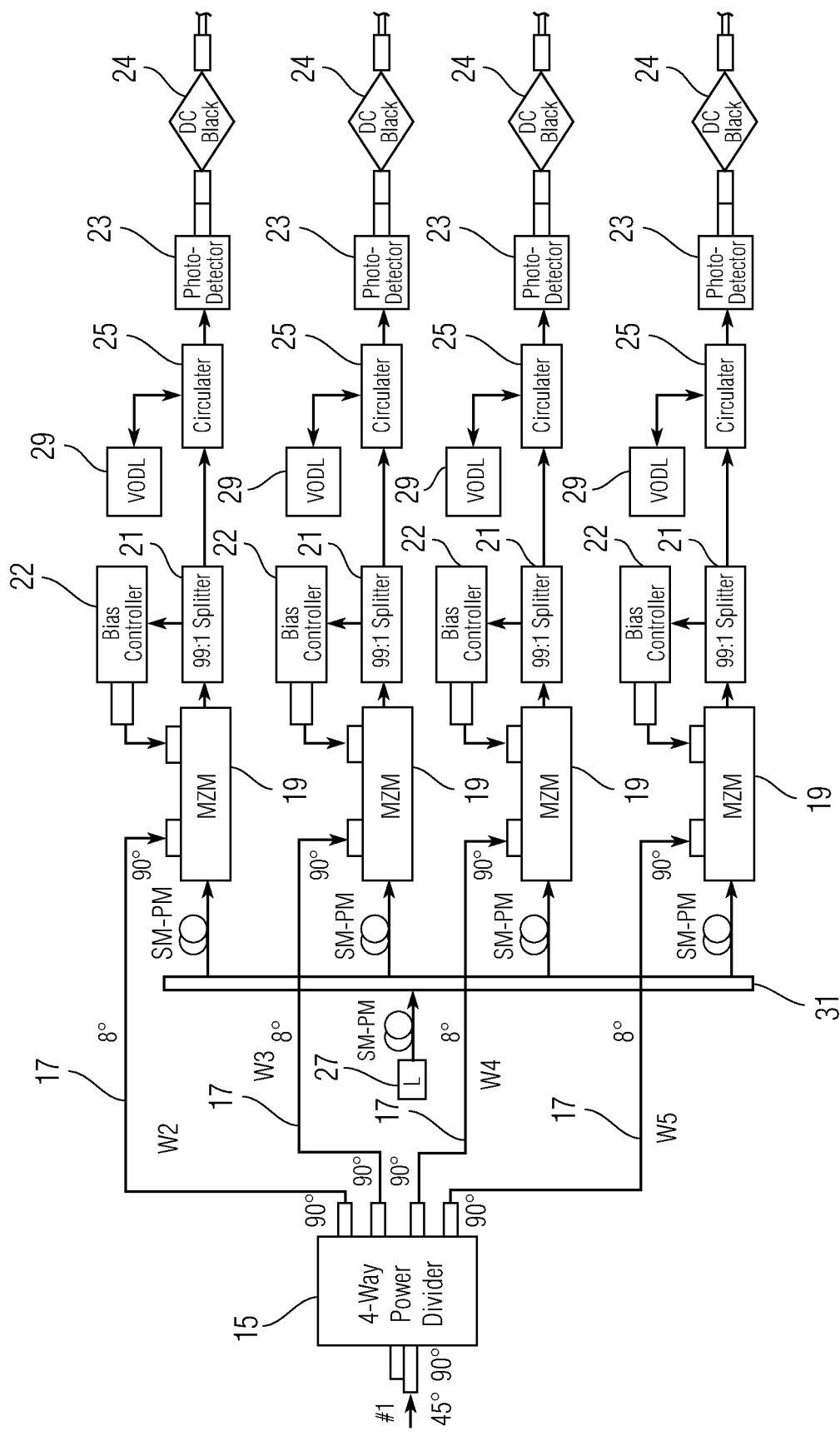
FIG. 4 shows a functional block diagram of an exemplary SDSAS 5 in accordance with one embodiment of the invention.

Generally, FIG. 4 shows a functional block diagram of an exemplary SDSAS 5. In this drawing, some lines convey electrical signals while other lines convey optical signals. At a far left section of FIG. 3, an entering RF signal is evenly divided to a desired number of channels via a RF power divider and then each channel is routed to a RF input port of a mach-zehnder modulator (MZM). The optical source ($I_{IN}$) is routed to an optical power divider via single mode-phase maintaining (SM-PM) optical fiber. The optical power is evenly divided to a desired number of channels via the optical power divider and then routed via SM-PM fiber to the optical input port of the MZM. The RF signal stimulated the MZM and encodes the electrical waveform onto the optical carrier at the MZM optical output port. 1% of the encoded optical signal is split off using a 99:1 splitter and fed into a DC voltage bias controller. The DC voltage bias controller sends control signal back to the MZM to ensure the MZM operates in quadrature. The remaining 99% of the encoded signal is send to an optical circulator via single mode (SM) fiber. The circulators direct the optical signal to the VODL which adds a specific time delay to the optical signal. The delay is calculated and delivered to the VODL from the system computer. The delayed signal is then routed via SM fiber back to the circulator and then to the photodetector. The photodetector decodes the optical carrier and extracts the original RF waveform plus the desired phase delay. The exemplary signal at this point is then routed through a DC block and out of the box.

In at least some embodiments, the RF SUT 7A can include a phased array signal processing system including a receiving system coupled with the amplifiers 8. The exemplary receiving system can include a signal pre-conditioning system to output digital signals and a computer system that processes the digital signals for a predetermined application comprising range, azimuth, and elevation determinations for each said plurality of simulated RF antenna signals. An exemplary RF SUT 7A can include an interferometric radio receiver. An exemplary RF SUT 7A can also be a cell tower signal processing system that is coupled with a number of antenna nodes forming a phased array. An exemplary laser system 27 can include a single mode polarization maintaining fiber output. Exemplary optical modulators 19 can each include or be a Mach-Zehnder modulator.

Figure 5:
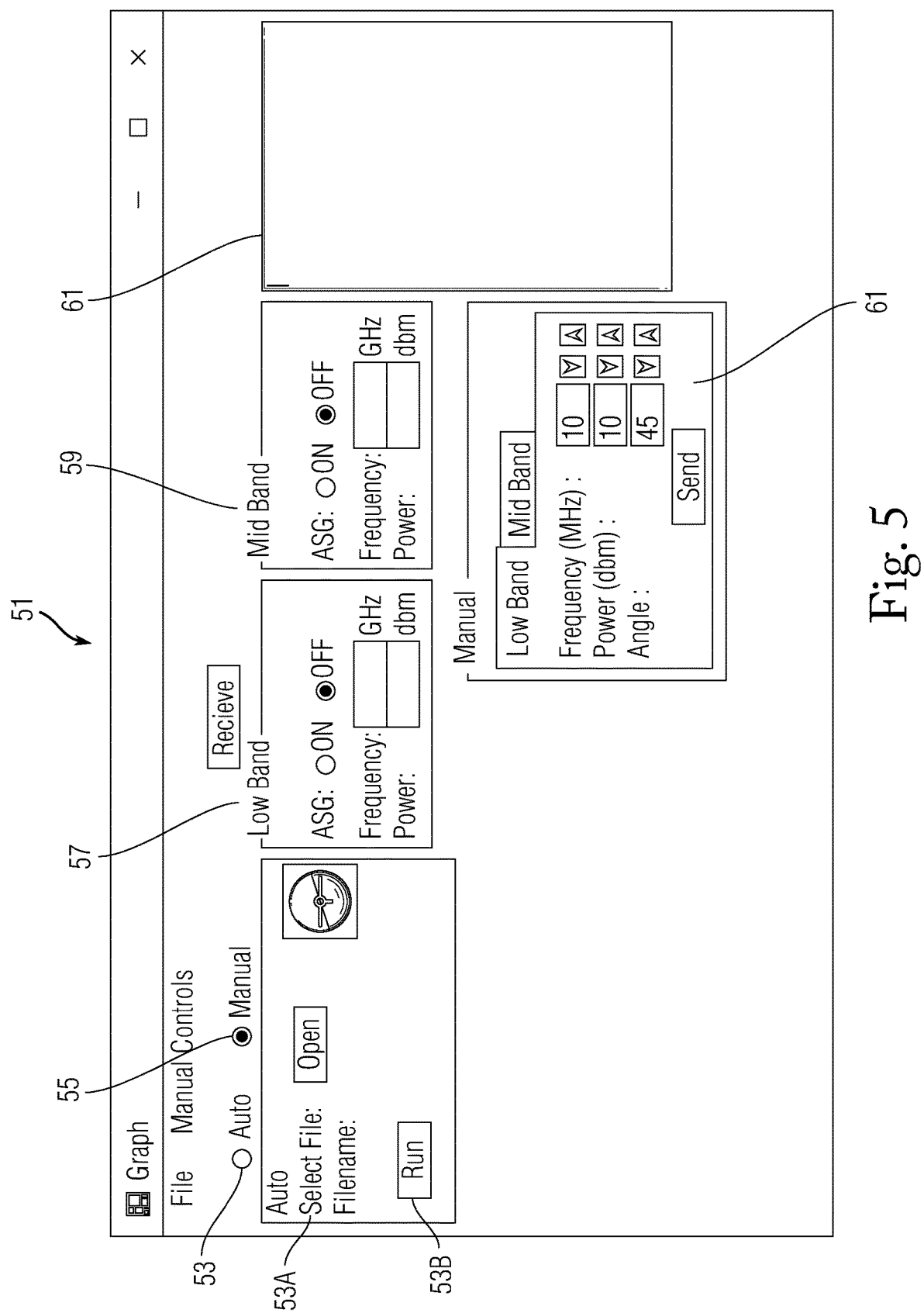
FIG. 5 shows an exemplary Graphical User Interface (GUI) used with one embodiment of an exemplary EMESTS.

FIG. 5 shows a graphical user interface (GUI) for use in operating the EMESTS 1 which includes DDOASS function calls 51 that operates various elements of the EMESTS 1 including EMESGS 3, the SDSAS 5 that generates simulated signals that are received by the EMSUT 7, amplifiers 8, VSAs 9, and EMSUT 7. The exemplary GUI 51 is shown on a display attached to the CSUI 4 (FIG. 1). DDOASS GUI 51 includes user input fields including location of each emitter (latitude, longitude), speed, desired angle of emitter, frequency of specified emitter, amplitude, etc.

Exemplary EMESTS 1 operation overview. Generally, various embodiments can incorporate a three dimensional model to model signal propagation from emitter to antenna elements which is used to determine signal delay. For example, an embodiment can use the World Geodetic System 1984 (WGS84) to Earth Center Earth Fixed (ECEF) system. WGS84 can be given as a latitude (radians), longitude (radians), and altitude (meters). ECEF can be given as a Cartesian coordinate. (X, Y, Z). Embodiments can include use of Earth Center Earth Fixed (ECEF) to East North Up (ENU) frameworks. ECEF and ENU can both be given as Cartesian coordinates (X, Y, Z). Exemplary systems can convert from ECEF to ENU to get a local coordinate system that is centered on a plane of the users choosing.

As noted herein, embodiments can include a system with two main parts ""Computation and Setup" and "Messaging". Exemplary Computation and Setup Phase. Exemplary computation and setup phase operations includes steps where a user will upload the exemplary CraneDIS file. This exemplary CraneDIS file can store information for a selected scenario that will be run (Platform and Emission PDUs). Once the user selects the correct file, all of the comparisons and mathematics will be run to calculate and determine data to be stored in DelayString 71A are performed. As these numbers are run they are written to a file "Time_Delays.txt" located at a specified file location. When all the PDUs are gone through the program then wait for the "Messaging" section to be called by the user. An exemplary Messaging Phase can include operations that can be initiated when the user uses selects run in the exemplary GUI; then the DDOASS 4A program will go into the "Messaging" phase operations and import the "Time_Delays.txt" created in "Computation and Setup" and parse it to produce an array that holds X amount of messages that have to be sent out to operate various elements of the EMESTS 1. After the file is imported, the DDOASS 41 program goes into a loop that waits for the Time associated with each DelayString 71A. When a time is reached, the exemplary DDOASS 4A program will start various threads, e.g., four threads that will control a certain group of devices in the EMESTS 1. These groups are characterized by Mid and Low band; this will be determined by the frequency for that DelayString 71A.

Referring to FIG. 6, exemplary simulation entity and environment scenario simulation configuration files (e.g., input scenario distributed interactive simulation (DIS) data elements (CraneDIS Data) 66) are shown. Simulation entity and environment scenario configuration file embodiments can be based on various formats that include IEEE Standard 1278 DIS format File, TENA format, or HLA formats. Various embodiments can include receiver platform data, emission systems data, tracking data, etc.). Input scenarios can use an exemplary format that such as a CraneDIS 66 format. CraneDIS format can include a message format based on the DIS protocol. In at least some embodiments, CraneDIS protocol data units (PDU) include PlatformData and EmissionData. Use of a DIS format also has an advantage of enabling easier integration with LVC based systems.

PlatformData 67. An exemplary PlatformData 67 PDU can be created as a modified version of an IEEE 1278 Entity State PDU (ESPDU) that includes a subset of information including location and orientation of an entity within a given scenario which could be an emitter or any other object or entity which could affect a given simulation. Exemplary PlatformData 67 information includes call sign, platform ID, location (latitude/longitude), altitude, orientation (yaw, pitch, roll), and velocity vector (x, y, z), date/time stamp of PDU update.

EmissionData 69. An exemplary EmissionData 69 can be created as a modified version of Electromagnetic Emission PDU (EEPDU) from the IEEE 1278 standard. The EEPDU has various emissions related information such as location, frequency, power, bandwidth, pulse width, pulse repetition frequency, azimuth center, azimuth sweep, elevation center, elevation sweep, beam sweep synch, and emitter ID, beam ID, emission ID, and call sign, date/time stamp of PDU update.

Referring to FIG. 7A, a description of several exemplary data structures are shown. A data string, DelayString 71A, can be used to hold EMESTS 1 control data that is produced during a setup/configuration scenario phase. This string includes delay information and other data that would be needed from the CraneDIS messages. An exemplary data structure can be comma delineated as follows: Quad, Time, MB_SBI_Array 1 Delay, MB_SBI_Array 2 Delay, MB_S-

BI_Array 3 Delay, MB_SBI_Array 4 Delay, MB_LBI_Array 1 Delay, MB_LBI_Delay 2, LB_SBI_Array 1 Delay, LB_SBI_Array 2 Delay, LB_LBI_Array 1 Delay, LB_LBI_Array 2 Delay, Angle, Power, Frequency. Another exemplary message phase data structure is timeDelays 71B. Class data variable timeDelays 71B is created or instantiated by a variety of different function calls, e.g., SetTimeDelayData, that accesses/reads DelayString 71A data to perform a given function call operation. More than one timeDelays 71B can be created as contrasted with DelayString 71A which is more of an input scenario configuration file.

Referring to FIG. 7B, a more detailed discussion of DelayString 71A is provided. Quadrant 71A1 gives what antenna quadrant has been selected for simulation where more than one set of phased arrays having different or overlapping fields of view or scan fields/apertures are used or simulated. For example, an aircraft can have four sets of phased array antennas denoted by quadrants A, B, C, and D (e.g., on either side of the aircraft nose and either of the aircraft tail) which are oriented towards a desired system field of view or orientation, e.g., 90 degree fields of view or orientations. Time 71A2 stores a time that commands should be sent in a format such as Month/Day/Year hh:mm:ss. MB_SBI Array 1 Delay 71A3 specifies a delay in pico seconds for the first midband (MB) short baseline interferometry (SBI) array. MB_SBI_Array 2 Delay 71A4 stores a delay value in pico seconds for a second MB SBI array. MB_SBI_Array 3 Delay 71A5 gives a delay in pico seconds for a third MB SBI array. In one embodiment, this value is set to 0 when it is used as a reference. MB_SBI_Array 4 Delay 71A6 gives a delay in pico seconds for a fourth MB SBI array. MB_LBI_Array 1 Delay 71A7 gives a delay in pico seconds for a first MB long baseline interferometry (LBI) array. LB_SBI_Array 1 Delay 71A8 gives a delay in pico seconds for a first lowband (LB) SBI array. LB_SBI_Array 2 Delay 71A9 gives a delay in pico seconds for a second LB SBI array. LB_LBI_Array 1 Delay 71A10 gives a delay in pico seconds for a first LB LBI array. LB_LBI_Array 2 Delay 71A11 gives a delay in pico seconds for a second LB LBI array. Angle 71A12 stores an angle of arrival value. Power 71A13 stores signal power. Frequency 71A14 stores signal frequency.

Referring to FIG. 8, a figure is provided showing DDOASS Function Calls 51. Exemplary BtnOpenFile_Click (System::Object^ sender, System::EventArgs ^e) function call 79 is a setup/configuration phase function call that executes in response to user selection of a GUI action element Auto 53 within Auto Setup GUI window 53A. Once the Auto GUI action element 53 is selected this function 79 executes to generate a Select File Open window is enabled so to prompts a user to select/load a file that includes the CraneDIS 66 input (e.g., PlatformData 67 and/or EmissionData 69) that the user wishes the DDOASS program 4A to execute. Once the file is loaded, each line of data in the selected file get parsed and separated into one of two arrays based on data type, either Platform or Emitter data (e.g., first word in a line is either "platform" or "emitter"). These lines get parsed from within platformData and emitterData classes.

An exemplary SetTimeDelayData(platformData, emitterData, filenameSafe) function call 79A is a setup or configuration phase function call included in the BtnOpenFile_Click function call 79 that receives local data variable DelayString 71A which is later output as an instantiated local timeDelays variable 71B. This function 79A takes platform and emitter data (e.g., latitude, longitude, altitude, speed, heading, yaw, pitch, roll) and calculates values that are needed to control elements of the EMSTS 1 (e.g., FIG. 7B data values of Quadrant (in this embodiment, Quadrant represents an identifier for collection of phased array antenna elements that a given SDAS 5 is simulating), Time, MBSBI array identifier (e.g., "1", "2", "3", "4"), LBSBI array identifier (e.g., "1", "2"), LBLBI array identifier (e.g., "1", "2"), angle, power, frequency). These calculated values are stored into variable DelayString 71A and outputted into a file, e.g. a .txt file, to be accessed after setup, configuration, or reconfiguration phase operations are complete (e.g., a messaging phase executed after setup or configuration phase is complete).

An exemplary SetupInstruments(timeDelays) function call 79B is included in BtnOpenFile_Click 79 that reads DelayString 71A data created by SetTimeDelayData 79A, saves output as a local instantiation of timeDelays 71B, which is used to set an exemplary EMESTS 1 system to various initial configurations/time delay programming settings based on a scenario loaded (e.g., Input Scenario DIS Platform Data Elements (CraneDIS Data 66)). EMESTS 1 elements that are configured by this function include RF switch (part of 3), optical delay lines or VODL modules (within 5), ASGs 3, VSAs 9, trombone delay lines. Note trombone lines are not shown in any figures but associated with a separate antenna used with an exemplary EM SUT 7A e.g. an antenna system that operates in parallel for geolocation calculation of a SUT which does not use angle of arrival information but rather receives information directly from a respective one or more ASGs 3 (in at least some embodiments, does not go through the SDSAS 5 systems).

An exemplary btnRun(System::Object^sender, System::EventArgs^e) 85 is a function with exemplary sub-functions (e.g., 85A-85F) that executes exemplary GUI button function 53B that enables a user to read the data string file DelayString 71A created from the setup/configuration phase and stores DelayString 71A information into another local instantiated class of timeDelays 71B. An exemplary embodiment then waits a set amount of time to call SendData.

Referring to FIG. 8B, GetData(timeDelays) 85A is an exemplary a sub-function called within btnRun 85 and reads the text file DelayString 71A from setup phase and instantiates a timeDelays 71B class with information from DelayString 71A. SendData(TimeDelays) 85B is another sub-function called within btnRun 8 that takes timeDelays 71B information and sends it to the various EMESTS 1 element (e.g., RF switch 3, optical delay lines 29, ASGs 3, VSAs 9, trombone delay lines (see above for description) to operate these system elements. Exemplary calculations for various delay values are done in the setup or configuration phase while this function sends resulting TimeDelays 71B data to EMESTS 1 system elements to configure or operate them.

SetStationaryMidBand(frequency, power, angle) function call 86A operates when Mid Band tab of GUI Manual mode 61 is selected/operated; this function call 86A then takes the input frequency, power and angle inputs from the GUI 61 input section and sends commands to set up the EMESTS 1 elements. Function call 86A takes input angle data and calculates an (X,Y) at a distance (e.g., a large distance) away and then calculates the distance between that (X,Y) and each selected antenna array or alternatively several antenna array elements. Function call 85A connects the relevant software sockets to appropriate IPs and ports; sends the delay, frequency, and power commands to various EMESTS 1 elements e.g., RF switch (part of 3 in this embodiment), optical delay lines or VODL modules 29, ASGs 3, etc.

SetStationaryLowBand(frequency, power, angle) 86B is a function call that operates when Low Band tab of GUI Manual mode section 61 is selected/operated then takes input frequency, power and angle inputs from this GUI 61 and sends commands to set up the EMESTS 1 elements. Function 86B takes input angle and calculates an (X,Y) at a distance, e.g., a large distance, away and then calculates a distance between that (X,Y) and each selected antenna array or selected antenna array elements. Function 86B connects the software sockets to the appropriate IPs and ports and sends the delay, frequency, and power commands to various EMESTS 1 elements e.g., RF switch (part of 3 in this embodiment that routes ASG 3 signals to a selected SDSAS 5 when multiple SDSAS 5 systems are used to simulate segments of phased array antenna groups), optical delay lines 29, ASGs 3, etc.

GetDistance(X1, Y1, Z1, X2, Y2, Z2) function call 86C returns distance between two points (X1,Y1,Z1) (X2,Y2,Z2) in meters. SendAbsIp(distance, Socket) 86D sends delay control data to the optical delay line(s) across a software socket. SendAbsIp (distance, Socket) function call 86D sends delay control data to one or more optical delay lines across a software socket. SendFreqIpAsg(frequency, IpEndPoint) function call 86E sends frequency to the ASG across IpEndPoint. SendPowerIpAsg(power, IpEndPoint) function call 86F sends power control values to the ASG across IpEndPoint (not shown).

Figure 9:
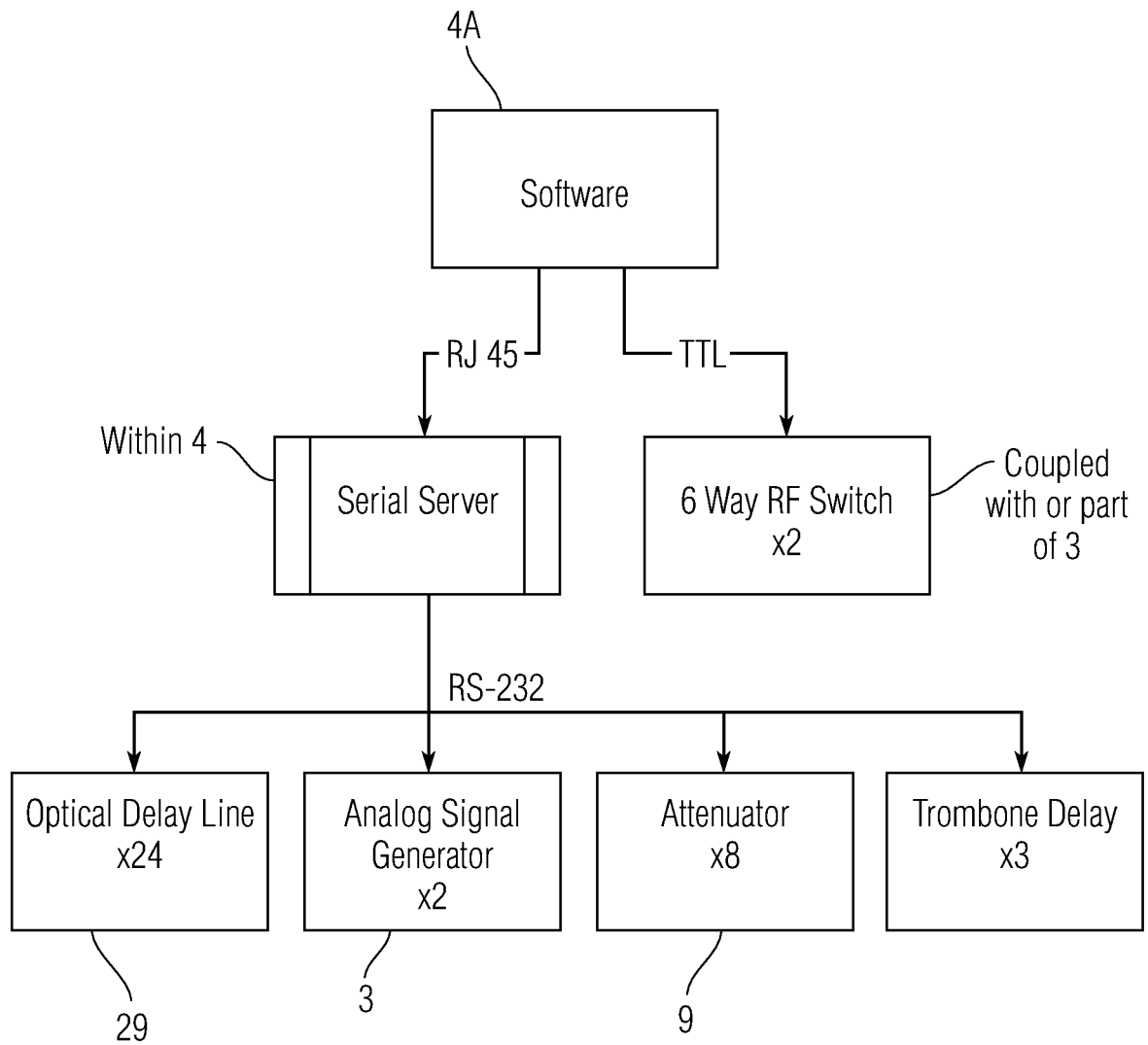
FIG. 9 shows an overview of interaction or control relationships between exemplary DDOASS software 4A and various EMESTS components.

Referring to FIG. 9, a functional overview of DDOASS software 4A interaction with various components are shown. In this embodiment, the DDOASS software 4A will control different parts of the EMESTS 1. Exemplary EMESTS 1 elements include 6. Way RF Switch (part of 3), optical delay lines 29 (e.g., 24 delay lines within SDSAS 5), analog signal generator(s) 3 (two in this depiction), and VSAs 9 (eight in this embodiment). Optional embodiments of a SUT include trombone delay line (not shown). The exemplary RF switch can be controlled through an I/O card installed in the control system and user interface system 4 using TTL protocol. A serial server (part of 4 in one embodiment but can be a stand-alone system connected with respective components) can be used to control the optical delay lines 29, ASG 3, VSA 9, and optional trombone delay lines using, e.g., an RS-232 interface/communication system. The exemplary computer 4 can be configured to network with the serial server by RJ-45. The server will convert a message through a socket to RS-232 control signals at a designated port. Note that in a variety of embodiments, there will be multiple SDSAS 5 systems which simulate different segments of an overall phased array system with different sensing field of views. An RF switch (e.g., within or connected to an output of the ASG 3) selectively couples outputs of the ASG 3 to a desired SDSAS 5 which is associated with a given collection of phased array antenna segments that are a subset of a larger collection of antenna array groups (e.g., quadrants) which collectively are a focus of a desired set of signal simulation output scenarios that are output by a selected SDSAS 5 eventually into a given input or set of inputs of a SUT (e.g., radar signal processing system).

Figure 10:
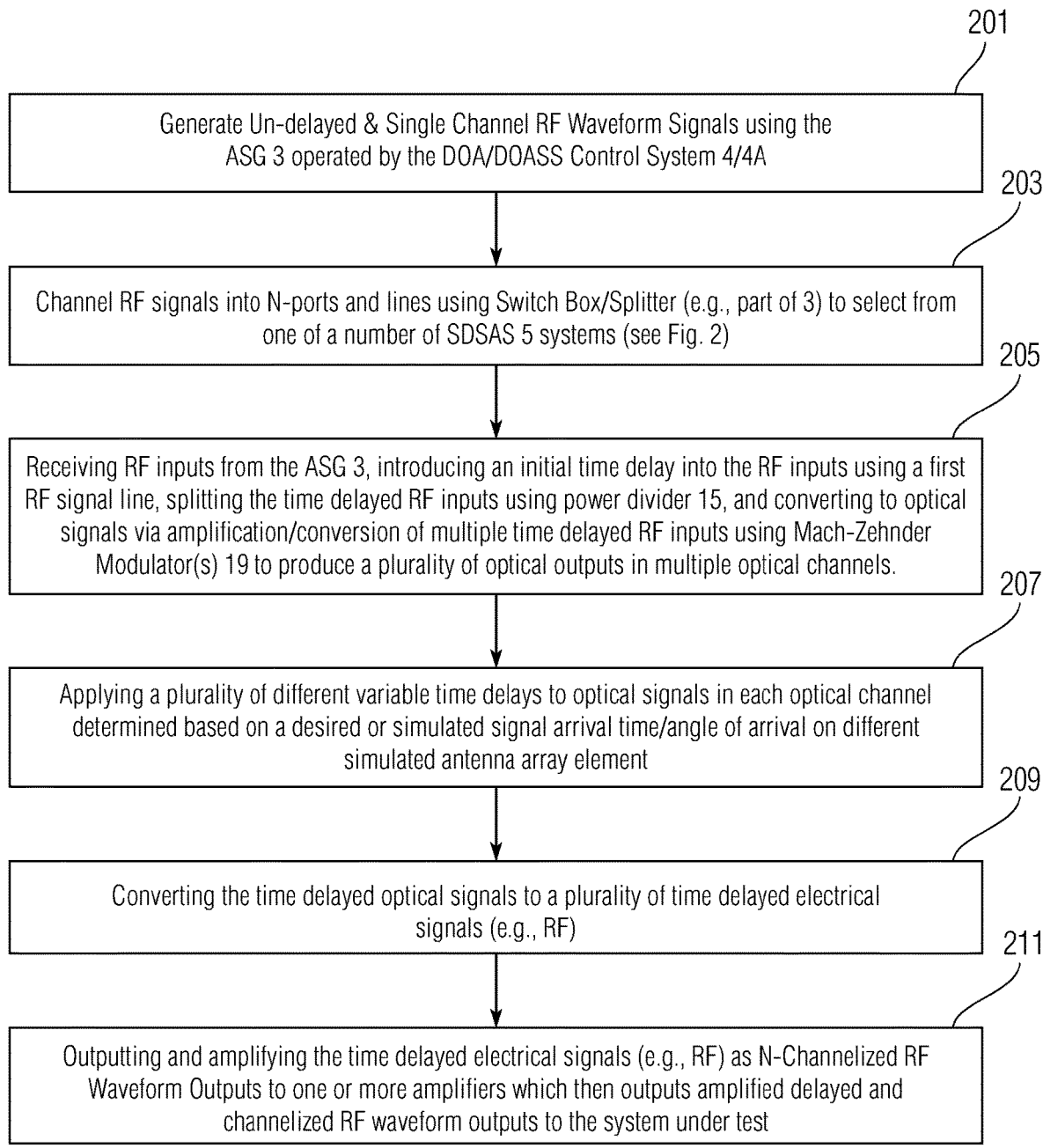
FIG. 10 shows an exemplary method of operation of an exemplary EMESTS system such as described herein in accordance with one embodiment of the invention.

Referring to FIG. 10, a method of operation is shown. At step 201: generate un-delayed and single channel RF waveform signals using the ASG 3 based on inputs from the DDOA/DDOASS Control System 4/4A. At Step 303: channel or route RF signals from the ASG 3 into N-ports and lines using Switch Box/Splitter (e.g., part of 3) to select from one of a number of SDSAS 5 systems (e.g., see FIG. 2). In this example, each SDSAS 5 simulates a sub-group of phased array antenna elements within a larger group of antenna groups (e.g., quadrants) connected to the EMSUT 7A) that is then eventually output a set of input ports (through VSAs/amplifiers) of a SUT (e.g., radar signal processor). At Step 205: Receiving RF inputs from the ASG 3, introducing an initial time delay into the RF inputs using a first RF signal line, splitting the time delayed RF inputs using power divider 15, and converting to optical signals via amplification/conversion of multiple time delayed RF inputs using Mach-Zehnder Modulator(s) 19 to produce a plurality of optical outputs in multiple optical channels. At Step 207: Applying a plurality of different variable time delays to optical signals in each optical channel determined based on a desired or simulated signal arrival time/angle of arrival on different simulated antenna array element. Each time delay computation will be determined based on use of the three dimensional model positons of emitter and receiver antenna elements accounting for different time of signal incidence on different simulated antenna array elements within a selected antenna array. At Step 209: Converting the time delayed optical signals to a plurality of time delayed electrical signals (e.g., RF). At Step 211: Outputting and amplifying/attenuating the time delayed RF or electrical signals as N-Channelized RF Waveform Outputs to one or more amplifiers which then outputs amplified delayed and channelized RF waveform outputs to the SUT 7A.

Figure 11A:
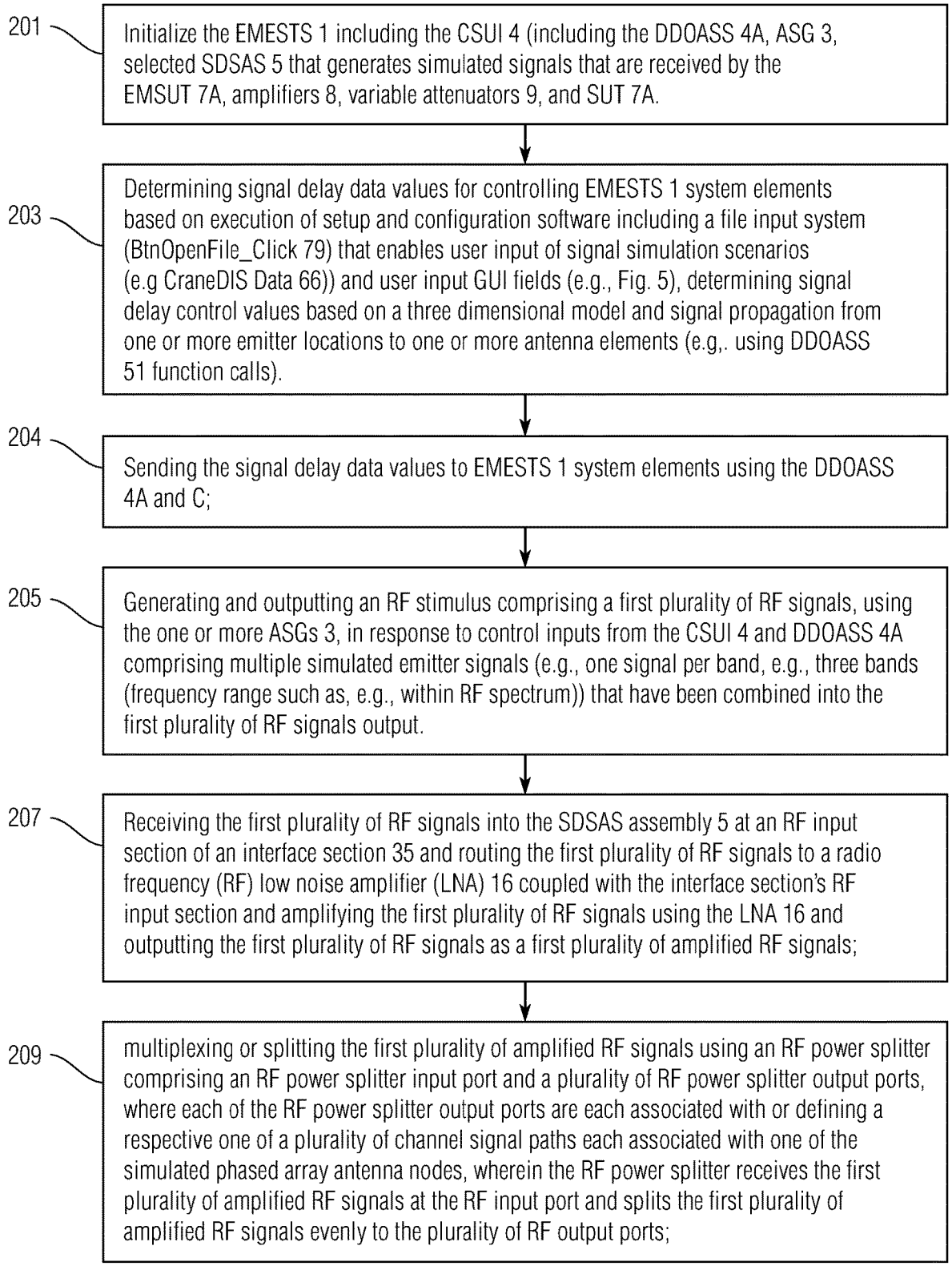
FIG. 11A shows another exemplary method of operation of an exemplary EMESTS such as described herein in accordance with one embodiment of the invention.

FIG. 11A shows a more detailed method of operation of an exemplary EMESTS 1 in accordance with one embodiment of the invention. Step 201: Initialize the EMESTS 1 including the CSUI 4 (including the DDOASS 4A, ASG 3, the SDSAS 5 that generates simulated signals that are received by the SUT 7A, amplifiers 8, VSAs 9, and SUT 7A, etc.). Step 203: Determining signal delay data values for controlling EMESTS 1 system elements based on execution of setup and configuration software including a file input system (BtnOpenFile_Click 79) that enables user input of signal simulation scenarios (e.g CraneDIS Data 66)) and user input GUI fields (e.g., FIG. 5), determining signal delay control values based on a three dimensional model and signal propagation from an emitter to one or more antenna elements (e.g., using DDOASS 51 function calls). Exemplary embodiments can include auto 53 or manual 55 GUI selected DOASAS operation. DOASS function calls 51 (e.g., one or more of function calls 79 to 86F) then determine signal delays which will be applied to different signals by the DOASAS 5 elements and stores resulting data in Delay-String 71A data structure which is then used by various elements of the DOASS 4A. (see FIGS. 7A-7D) Step 204: Sending the signal delay data values to EMESTS 1 system elements using the DDOASS 4A and C. Step 205: Generating and outputting an RF stimulus comprising a first plurality of RF signals, using the one or more ASGs 3, in response to control inputs from the CSUI 4 and DDOASS 4A, comprising multiple simulated emitter signals (e.g., one signal per band, e.g., three bands (frequency range such as, e.g., within RF spectrum)) that have been combined into the first plurality of RF signals output. Exemplary simulated emitter signals are ones that are expected to be transmitted to and later received by the SUT 7 at one or more specific emitter 3D space or geolocation equivalent locations with respect to a simulated antenna or group of phased array antenna elements within a simulated EM environment comprising the simulated emitter signal source(s) and antenna elements. Step 207: Receiving the first plurality of RF signals into the SDSAS assembly 5 at an RF input section of an interface section 35 and routing the first plurality of RF signals to a radio frequency (RF) low noise amplifier (LNA) 16 coupled with the interface section's RF input section and amplifying the first plurality of RF signals using the LNA 16 and outputting the first plurality of RF signals as a first plurality of amplified RF signals. Step 209: multiplexing or splitting the first plurality of amplified RF signals using an RF power splitter comprising an RF power splitter input port and a plurality of RF power splitter output ports, where each of the RF power splitter output ports are each associated with or defining a respective one of a plurality of channel signal paths each associated with one of the simulated phased array antenna nodes, wherein the RF power splitter receives the first plurality of amplified RF signals at the RF input port and splits the first plurality of amplified RF signals evenly to the plurality of RF output ports.

FIG. 11B shows a continuation of the FIG. 11A exemplary method. Step 211: Selectively compensating for signal delay or lack of simultaneous output of the first plurality of amplified RF signals from the RF power splitter to within a predetermined time range, e.g., a picosecond, caused by the RF power splitter by passing the providing a plurality of phase and time stable rigid RF cables that are relatively temperature insensitive, where one end of the plurality of RF cables are respectively connected each of the plurality of RF power splitter output ports and each defining a part of each of the plurality of channel signal paths, where a length of each RF cable is further determined based on a signal transit delay difference determination between each of the plurality of fiber optic lines such that one or more of the plurality of RF cables are lengthened or shortened to within a range of delay capability associated with optical delay lines used in the SDSAS 5 to reduce differences between outputs from the SDSAS 5 to within a predetermined range, e.g., one picosecond, to further reduce signal timing output timing between each path at the SDSAS 5 output section. Step 213: transforming the split or multiplexed first plurality of amplified RF signals into a first plurality of optical signals associated with each of the signal paths using a laser modulators, laser or lasers, and optical splitter section that are driven by the split or multiplexed first plurality of amplified RF signals to generate a plurality of first optical signal outputs with phase, frequency, and power determined based on the input split or multiplexed first plurality of amplified RF signals. Step 215: providing a plurality of optical modulators 19 each comprising an optical signal input respectively coupled with one of the optical splitter outputs, a modulated optical signal output, an optical modulator RF input each coupled to one of the plurality of RF cables, and a DC voltage bias controller, wherein each of the optical modulators output a respective encoded optical waveform output encoded based on each of the amplified RF signals. Step 217: receiving the respective encoded optical waveform outputs from the plurality of optical modulators and generating a plurality of first and second percentage of input optical signal power outputs respectively using a plurality of optical splitters 21, each comprising an optical splitter input port and a plurality of optical splitter output ports, wherein the plurality of optical splitter output ports comprises a first optical splitter output port and a second optical splitter output port, wherein the first optical splitter output port outputs the first percentage of input optical signal power output and the second optical splitter output port outputs the second percentage of input optical signal power output, wherein said second optical splitter output port is connected to a DC voltage bias controller to provide a feedback loop to each of the optical modulators based on the second percentage of input optical signal power output.

FIG. 11C shows a continuation of the FIGS. 11A and 11B exemplary methods. Step 219: receiving and routing the percentage of input optical signal power outputs to a plurality of variable optical time delay modules using a plurality of optical circulators each comprising a first, second and third optical circulator signal ports wherein each said first optical circulator signal port is respectively coupled with one said first optical splitter output port that further defines a portion of a respective one of said plurality of channel signal paths, wherein each of the optical circulator signal ports are bidirectional optical signal ports, wherein the plurality of variable optical delay modules is respectively associated with one of said channels, wherein each of said variable optical delay module is coupled with a respective second optical circulator signal ports, wherein each of said plurality of variable optical delay modules comprises an optical delay line section and a variable optical delay line control section that controls the delay line section, each said variable optical delay module provides a selectively adjustable time delay, wherein the variable optical delay line control section is coupled to said control computer and is operated by said simulation control software that adjusts time delay of each optical signal received from a respective said first optical circulator signal port that then passes through a respective optical delay line section to provide RF phase difference adjustment equivalents via respective time delay adjustments in an optical domain to the optical signal received from the respective first optical circulator signal port that is adjusted to correlate to a specified angle of arrival associated with each of the antenna nodes within the simulated phased array antenna, wherein variable optical delay module outputs are routed back to respective said second optical circulator signal port then out of each respective optical circulator via respective ones of said third optical circulator signal ports to a respective one of a plurality of photodetectors 23, wherein the plurality of photodetectors 23 converts input optical signals to a voltage output signal. Step 221: Respectively receiving voltage signal outputs from the plurality of photodetectors using a plurality of direct current (DC) blocks 24 that are each respectively coupled with respective ones of said plurality of photodetectors, wherein each DC block outputs a voltage signal corresponding to an optimized delayed signal output corresponding to respective said variable optical delay module outputs, wherein each of said DC comprises a DC block output connector that outputs the plurality of simulated RF antenna signals from the SDSAS 5. Step 223: amplifying outputs from the plurality of DC blocks using a plurality of amplifiers each coupled to receive SDSAS 5 outputs comprising amplified said plurality of simulated RF antenna signals from respective DC block output connectors; Step 225: processing amplified said plurality of simulated RF antenna signals from the plurality to of amplifiers using the system under test that receives the plurality of amplified simulated RF antenna signals outputs from the respective plurality of amplifiers then performs signal processing comprising phase and amplitude measurements.

Figure 12:
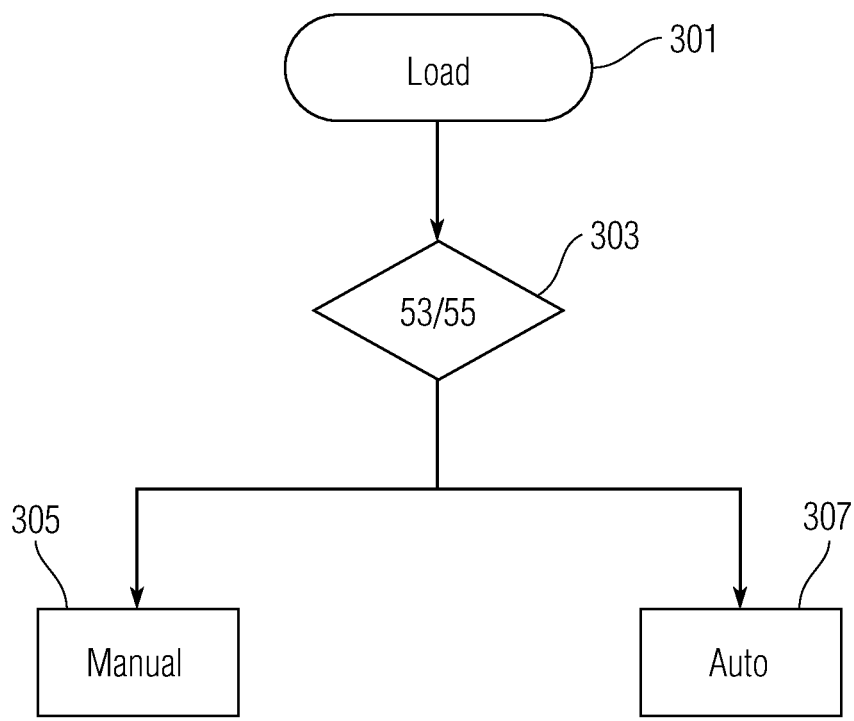
FIG. 12 shows an exemplary high level flowchart of execution of exemplary DODASS software 4A and EMESTS elements.

FIG. 12 shows an exemplary high level flowchart of execution of exemplary DODASS software 4A and EMESTS elements. Step 301: load and execute DDOASS 4A software and initially configure EMESTS 1 components (e.g., see FIGS. 2-4). Step 303: Select manual or automatic execution processing from GUI 51 (53/55), input data, select file inputs (if automatic mode selected), and input data called for by GUI 51. Execute Manual 305 or Auto 307 processing.

Figure 13A:
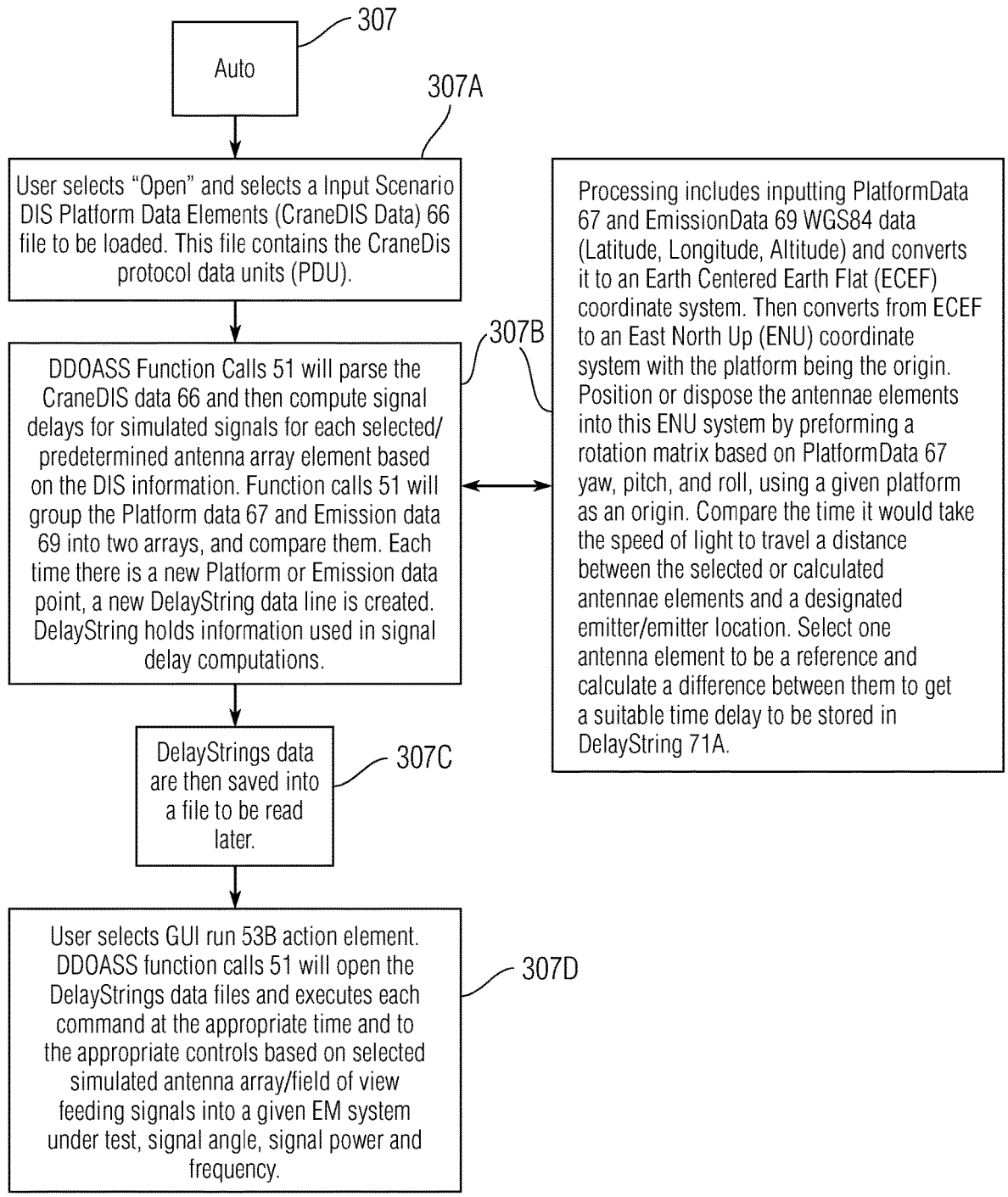

FIGS. 13A and 13B shows an exemplary high level flow chart showing execution of an auto or automatic phase sequence of operations of exemplary DDOASS software and EMESTS system in accordance with one embodiment of the invention. Referring to FIG. 13A, at Step 307: executing Auto mode by selection of GUI element 53. At Step 307A:

User selects "Open" and selects a Input Scenario DIS Platform Data Elements (CraneDIS Data) 66 file to be loaded. This file contains the CraneDis protocol data units (PDU). At Step 307B: DDOASS Function Calls 51 will parse the CraneDIS data 66 and then compute signal delays for simulated signals for each selected/predetermined antenna array element based on the DIS information. Function calls 51 will group the Platform data 67 and Emission data 69 into two arrays, and compare them. Each time there is a new Platform or Emission data point, a new DelayString data line is created. DelayString holds information used in signal delay computations. In at least one embodiment, within Step 307B, processing includes inputting PlatformData 67 and EmissionData 69 WGS84 data (Latitude, Longitude, Altitude) and converts it to an Earth Centered Earth Flat (ECEF) coordinate system. Then converts from ECEF to an East North Up (ENU) coordinate system with the platform being the origin. Position or dispose the antennae elements into this ENU system by preforming a rotation matrix based on PlatformData 67 yaw, pitch, and roll, using a given platform as an origin. Compare the time it would take the speed of light to travel a distance between the selected or calculated antennae elements and a designated emitter/emitter location. Select one antenna element to be a reference and calculate a difference between them to get a suitable time delay to be stored in DelayString 71A. At Step 307C: DelayStrings data are then saved into a file to be read later. At Step 307D: User selects GUI run 53B action element. DDOASS function calls 51 will open the DelayStrings data files and executes each command at the appropriate time and to the appropriate controls based on selected simulated antenna array/field of view feeding signals into a given EM system under test, signal angle, signal power and frequency.

Referring to FIG. 13B, details of processing performed as described in FIG. 13A are shown. In particular, exemplary software processing steps when a location is updated (either emitter or platform). In one example, updates can include a case where a plane (platform) moves five times before a new emitter location is given, or vise versa. Because of this we want to check each time which object created the new delays. Example: Data is provided as follows: PlatformData Alpha15 45 "001 2013 00:08:00"; PlatformData Alpha15 45 "001 2013 00:08:40"; EmissionData Alpha15 45 "001 2013 00:08:30"; EmissionData Alpha15 45 "001 2013 00:08:35"; EmissionData Alpha15 45 "001 2013 00:08:40"; EmissionData Alpha15 45 "001 2013 00:08:45"; EmissionData Alpha15 45 "001 2013 00:08:50". The first delay times passed will be paired with 00:08:30 because that is when the system first evaluated or parsed a first complete set of data based on time. Then an exemplary system will evaluate what will move next, so an exemplary system evaluates at count +1 and compare times. An exemplary system would be looking at 00:08:40 and 00:08:35. This means that at 00:08:35 an evaluated Platform is still at the 00:08:00 location, so the system will have to compare the 00:08:00 PlatformData with the 00:08:35 EmissionData. Thus, an exemplary system function call will only step the emitterCount and not the platformCount. Data evaluated in this sequence includes DelayString: Quad, Time, MB_SBI_Array 1 Delay, MB_SBI_Array 2 Delay, MB_SBI_Array 3 Delay, MB_SBI_Array 4 Delay, MB_LBI_Array 1 Delay, MB_LBI_Delay 2, LB_SBI_Array 1 Delay, LB_SBI_Array 2 Delay, LB_LBI_Array 1 Delay, LB_LBI_Array 2 Delay, Angle, Power, Frequency.

Figure 14:
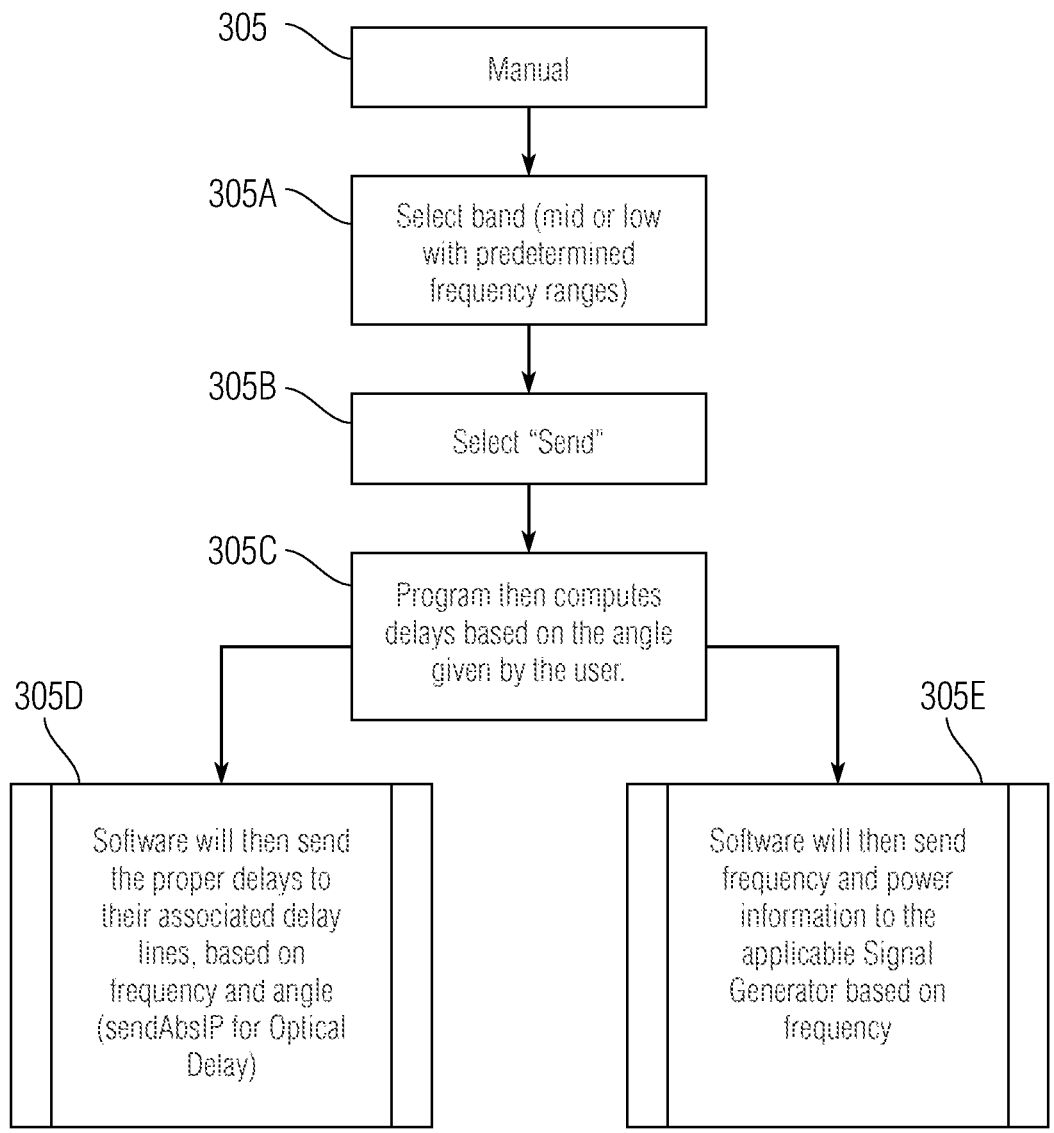
FIG. 14 shows an exemplary high level flow chart showing execution of an exemplary manual phase sequence of operations of exemplary DDOASS software and EMESTS.

FIG. 14 shows an exemplary high level flow chart showing execution of an exemplary manual phase sequence of operations of exemplary DDOASS software 4A and EMESTS 1. At Step 305, a user will activate a manual mode selection 61 of GUI 51. At Step 305A, select band (mid or low with predetermined frequency ranges) via GUI 51. At Step 305B, select Send function within GUI manual mode section 61. At Step 305C, DDOASS 4A/DDOASS function calls 51 computes delays based on an angle input in the GUI 51 by the user. At Step 305D, DDOASS 4A/DDOASS function calls 51 send determined delay lines, based on frequency and angle (e.g., sendAbsIP for optical delay). At Step 305E, DDOASS 4A/DDOASS function calls 51 sends frequency and power information to applicable ASG 3 based on frequency.

Although the invention has been described in detail with reference to certain preferred embodiments, variations and modifications exist within the spirit and scope of the invention as described and defined in the following claims.

The invention claimed is:

1. A hardware in the loop simulation and test system that includes a phased array antenna simulation system providing dynamic range and angle of arrival signal simulation associated with a plurality of simulated phased array antenna nodes comprising:

a phased array antenna simulation system control computer (hereinafter control computer) comprising a processor, input and output section, a display, a data or machine instruction storing a plurality of simulation control software machine instructions adapted to control said hardware in the loop simulation and test system;

a communication server coupled with the control computer, wherein the communication server further comprises a plurality of communication signal bus lines comprising a first, second, third, fourth, fifth, and sixth plurality of communication bus lines;

a radio frequency (RF) environment signal generator system that generates a plurality of RF signal outputs each corresponding to a simulated RF signal;

a Signal Delivery and Synchronizer/Adjusting System assembly (SDSAS) that includes a plurality of phased array antenna simulation signal processing systems that includes optical components in a plurality of optical signal paths for generating a plurality of simulated RF antenna signal outputs, the SDSAS comprises:

an interface section comprising an input and output section further comprising an RF input section that is respectively coupled to one of said plurality of RF signal outputs of said RF environment signal generator and a signal conditioning system thereby receiving one of said plurality of RF signal outputs, a plurality of phased array antenna simulation signal system RF outputs, a power input and conditioning system input, and a plurality of control signal bus elements coupled with said first plurality of communication signal bus lines;

a radio frequency low noise amplifier (RFLNA) coupled with the interface section's RF input that receives RF inputs, wherein a RF input signals is increased inside the RFLNA and output as an amplified RF signal;

an RF power splitter comprising an RF power splitter input port and a plurality of RF power splitter output ports, wherein each of said RF power splitter output ports are each associated with or defining a respective one of a plurality of channel signal paths each associated with one of said simulated phased array antenna nodes, wherein the RF power splitter receives the amplified RF signal at the RF power splitter input port and splits the amplified RF signal evenly to the plurality of RF power splitter output ports;

a plurality of rigid RF cables, wherein one end of the plurality of rigid RF cables are respectively connected to each of the plurality of RF power splitter output ports and each defining a part of each of said plurality of channel signal paths, wherein a length of each rigid RF cable is determined based on a signal transit delay difference determination between each of a plurality of fiber optic lines such that one or more of the plurality of rigid RF cables may be lengthened or shortened to ensure that outputs from the SDSAS are output simultaneously within a predetermined range to accommodate for signal timing of arrival discrepancies between each path at a SDSAS output;

a laser system;

an optical splitter coupled with the laser system, wherein the optical splitter further includes a plurality of optical splitter outputs;

a plurality of optical modulators each comprising an optical signal input respectively coupled with one of the optical splitter outputs, a modulated optical signal output, an optical modulator RF input each coupled to one of the plurality of rigid RF cables, and a DC voltage bias controller, wherein each of the optical modulators encode a respective waveform of each of the amplified RF signals that is output by each of the modulated optical signal outputs;

a plurality of optical splitters, each comprising an optical splitter input port and a plurality of optical splitter output ports, wherein the plurality of optical splitter output ports comprises a first optical splitter output port and a second optical splitter output port, wherein the first optical splitter output port outputs a first percentage of input optical signal power and the second optical splitter output port outputs a second percentage of input optical signal strength power, wherein said second optical splitter output port is connected to said DC voltage bias controller to provide a feedback loop to each of the optical modulators;

a plurality of optical circulators each comprising a first, second and third optical circulator signal ports wherein each said first optical circulator signal port is respectively coupled with one said first optical splitter output port that further defines a portion of a respective one of said plurality of channel signal paths, wherein each of the optical circulator signal ports are bidirectional optical signal ports;

a plurality of photodetectors that convert said first and second percentages of input optical signals to a voltage output signal;

a plurality of variable optical delay modules, wherein each of said variable optical delay modules is respectively associated with one of said channel signal paths, wherein each of said variable optical delay modules is coupled with a respective second optical circulator signal port, wherein each of said plurality of variable optical delay modules comprises an optical delay line section and a variable optical delay line control section that controls the optical delay line section, each of said variable optical delay modules provide a selectively adjustable time delay, wherein the variable optical delay line control section is coupled to said control computer and is operated by said simulation control software that adjusts time delay of each of said optical signals received from a respective said first optical circulator signal port that then passes through a respective optical delay line section to provide RF phase difference adjustment equivalents via respective time delay adjustments in an optical domain to the each of said optical signals received from the respective first optical circulator signal port that is adjusted to correlate to a specified angle of arrival associated with each of the phased array antenna nodes within a simulated phased array antenna, wherein variable optical delay module outputs are routed back to respective said second optical circulator signal port then out of each respective optical circulator via respective said third optical circulator signal port to a respective one of said plurality of photodetectors;

a plurality of direct current (DC) blocks each respectively coupled with respective ones of said plurality of photodetectors, wherein each of said DC blocks output a voltage signal corresponding to an optimized delayed signal output corresponding to respective said variable optical delay module outputs, wherein each of said DC blocks comprises a DC block output connector that outputs a plurality of simulated RF antenna signals from the SDSAS;

a plurality of amplifiers each coupled to receive SDSAS 5 outputs comprising said plurality of simulated RF antenna signals from said DC block output connectors; and an RF system under test that receives the plurality of simulated RF antenna signal outputs from the respective plurality of amplifiers then performs signal processing comprising phase and amplitude measurements.

2. A system as in claim 1, wherein said RF system under test comprises a phased array signal processing system including a receiving system coupled with the plurality of amplifiers, wherein the receiving system comprises a signal pre-conditioning system to output digital signals and a computer system that processes the digital signals for a predetermined application comprising range, azimuth, and elevation determinations for each said plurality of simulated RF antenna signals.

3. A system as in claim 1, wherein said RF system under test comprises an interferometric radio receiver.

4. A system as in claim 3, wherein said RF system under test comprises a cell tower signal processing system that is coupled with a plurality of antenna nodes forming a phased array.

5. A system as in claim 1, wherein said laser system comprises a single mode polarization maintaining fiber output.

6. A system as in claim 1, wherein said optical modulators each comprises a Mach-Zehnder modulator.

7. A hardware in the loop simulation and test system that includes a phased array antenna simulation system providing dynamic range and angle of arrival signals simulation for input into a system under test (SUT) comprising:

a control system that determines a plurality of signal delays based on creating a three dimensional model that plots a location of an emitter and a collection of antenna elements then computes signal propagation data at a given distance, frequency, power and computing different time and location of incidence of a radio frequency (RF) wave on one or more elements of the collection of antenna elements;

a signal generator system that generates a plurality of first signals at a first electromagnetic spectrum (EM);

a first signal delay system that adds a predetermined signal delay to the first plurality of first signals;

a signal conversion system that converts the plurality of first signals with the predetermined signal delay from a first category of EM frequency range into a plurality of second signals having a different category of EM signal frequency range then applies a plurality of variable signal delays to the plurality of second signals to generate a plurality of third signals, wherein the first category of EM frequency range comprises radio frequency range signals and a second category of EM frequency range comprises optical signal range signals, wherein the signal conversion system further converts the plurality of third signals comprising optical signals with selectively applied signal delays back to the first category of EM frequency range signals to generate a plurality of fourth signals.

8. The system as in claim 7, further comprising an attenuating or amplifying system that receives the plurality of signals and attenuates or amplifies the plurality of signals and outputs a plurality of attenuated or amplified signals; and a signal processing system under test (SPSUT) input ports then operating a signal processing system in various testing scenarios.

9. A method of operating a signal processing system with a hardware in the loop simulation system that generates input signals based on a simulated electromagnetic environment comprising:

computing a plurality of signal delay control values, using a control system, based on platform data and emitter data, wherein the platform data and emitter data comprises location data within a three dimensional reference frame, wherein platform data includes phased array antenna data, wherein emitter data comprises frequency and power from a propagated signal from an emitter at a received location of a platform, wherein the control system further computes angle of arrival to the platform of the propagated signal from the emitter;

generating, using a signal generator, a plurality first signals comprising radio frequency (RF) signals based on a plurality of power and frequency inputs from the control system created based on the emitter data and the platform data;

introducing a first signal delay into a first plurality of signals, using a plurality of signal transmission lines to produce a second plurality of signals;

transforming the second plurality of signals into a third plurality of signals, wherein the second plurality of signals are transformed into the third plurality of signals using a laser modulated at least in part by some of the plurality of signal delay control values and an electrical signal derived from the second plurality of signals;

converting the third plurality of signals from a plurality of optical signals into a fourth plurality of radio frequency signals using a photodetector;

amplifying or attenuating the fourth plurality of radio frequency signals using the control system; and stimulating a signal processing system using the amplified or attenuated fourth plurality of signals.

10. The method of claim 9, wherein the control system further comprises a display and an input and output system that generates a graphical user interface (GUI) that displays a user interface with automatic or manual simulation mode selection input sections, wherein the GUI further comprises a file input section that is operable to enable a user to select a simulation scenario input file that comprises platform and emitter data.

11. The method of claim 10, wherein the control system further comprises a setup and configuration processing module and a messaging module that is executed by the control system or a processor in the control system, wherein the control system executes the setup and configuration processing module or the messaging module based on user interaction with the GUI.

12. The method of claim 11, wherein the setup and configuration module reads in the simulation scenario input file that comprises a plurality of simulation data including frequency, power, and location of the emitter that is simulated by a method and related apparatus elements, wherein the simulation scenario input file's platform data further comprises location, band, and antenna identifier data.

13. A method of operating a signal processing system using simulated signals comprising:

computing a plurality of signal delay control values, using a control system, based on platform data and emitter data, wherein the platform and emitter data comprises location data within a three dimensional reference frame, wherein platform data includes phased array antenna data, wherein emitter data comprises frequency and power from a propagated signal from an emitter at a received location of a platform, wherein the control system further computes angle of arrival to the platform of the propagated signal from the emitter;

generating un-delayed and single channel RF waveform signals using an analog signal generator (ASG) based on inputs from the control system that provides power and frequency control signals;

channeling or routing an Radio Frequency (Rn signal from the ASG into N-ports and lines of a Signal Delivery and Synchronizer/Adjusting System (SDSAS) using a router or splitter;

generating a first, second, and third plurality of time delayed signals using the SDSAS using a plurality of signal conversion sequences comprising receiving an RF signal inputs from the ASG, introducing an initial time delay into the RF signal inputs using a first RF signal line to generate the first plurality of time delayed signals, splitting the first plurality of time delayed signals using a power divider, and converting the first plurality of time delayed signals to the third plurality of time delayed signals comprising optical signals by amplification or conversion of the second plurality of time delayed signals that comprises multiple time delayed RF inputs using a Mach-Zehnder Modulator(s) to produce the third plurality of time delayed signals that comprises a plurality of optical outputs in multiple optical channels;

applying a plurality of different variable time delays to the third plurality of time delayed signals comprising optical signals in each optical channel determined to generate a fourth plurality of time delayed signals based on a desired or simulated signal arrival time or angle of arrival on different simulated antenna array elements, wherein each time delay computation is determined based on a three dimensional model positions of said emitter and receiver antenna elements accounting for different time of signal incidence on different simulated antenna array elements within a selected antenna array;

converting the fourth plurality of time delayed signals comprising time delayed optical signals to a fifth plurality of time delayed signals comprising electrical signals at RF;

outputting and amplifying or attenuating the fifth plurality of time delayed signals as N-channelized RF waveform outputs to one or more amplifiers which then outputs amplified delayed and channelized RF waveform outputs to a system under test comprising a signal processor system; and stimulating the signal processing system using the amplified or attenuated fifth plurality of time delayed signals.

* * * * *